US012730590B2

(12) United States Patent
Patel et al.

(10) Patent No.: US 12,730,590 B2
(45) Date of Patent: Sep. 8, 2026

(54) DEVICES AND METHODS FOR MANAGING COMMAND RETRIEVAL AND EXECUTION

(71) Applicant: SK Hynix NAND Product Solutions Corp., Rancho Cordova, CA (US)

(72) Inventors: Dimpesh Patel, Surrey (CA); Jonathan Hughes, Longmont, CO (US); Zachary Fu, Coquitlam (CA); Neelesh Vemula, Santa Clara, CA (US)

(73) Assignee: Solidigm Inc., Rancho Cordova, CA (US)

( * ) Notice: Subject to any disclaimer, the term of this patent is extended or adjusted under 35 U.S.C. 154(b) by 0 days.

(21) Appl. No.: 18/988,470

(22) Filed: Dec. 19, 2024

(65) Prior Publication Data

US 2026/0178227 A1 Jun. 25, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
CPC .... G06F 3/0659; G06F 3/0604; G06F 3/0644; G06F 3/0679
See application file for complete search history.

(56) References Cited

U.S. PATENT DOCUMENTS 11,032,373 B1 * 6/2021 Mallick ............... H04L 41/0896
2012/0311193 A1 * 12/2012 Erdmann ............. G06F 13/385 710/5
2012/0311230 A1 * 12/2012 Larson .................. G06F 3/0679 711/E12.008
2012/0311231 A1 * 12/2012 Porterfield ............. G11C 16/06 711/E12.008
2017/0090753 A1 3/2017 Benisty et al.
2019/0278515 A1 * 9/2019 Wells ...................... G06F 3/064
2020/0192581 A1 6/2020 Jung et al.
2021/0271421 A1 9/2021 Zhu et al.
2022/0027092 A1 1/2022 Katagiri
2023/0333776 A1 10/2023 Balasubramani et al.

* cited by examiner

*Primary Examiner* — Kevin Verbrugge
(74) *Attorney, Agent, or Firm* — HG LAW LLP

(57) ABSTRACT

A device and a related method are provided. The device includes system memory for storing a plurality of queue sets, each queue set including at least one command from the host, and processing circuitry. For each queue set, the processing circuitry determines a priority, a command limit, a number of outstanding commands, a throughput limit based on the priority, a required throughput to be used in connection with the outstanding commands, whether the command limit is greater than the number of outstanding commands, and whether the throughput limit is greater than the required throughput. Based on determining that the command limit is greater than the number of outstanding commands and that the throughput limit is greater than the required throughput, the processing circuitry further retrieves the outstanding commands, reserves at least a portion of the required throughput, and executes the retrieved outstanding commands using at least the reserved required throughput.

20 Claims, 16 Drawing Sheets

800
812
814
816
818
820
First Credits Value
802
804
806
808
810
Time 801
813
815
817
819
821
Second Credits Value
803
805
807
809
811
Time

DEVICES AND METHODS FOR MANAGING COMMAND RETRIEVAL AND EXECUTION

TECHNICAL FIELD

The present disclosure is directed to devices and methods for managing retrieving and execution of commands received from a host device.

SUMMARY

In accordance with the present disclosure, devices and methods are provided for managing the retrieving (i.e., fetching) and execution of commands from virtual entities (e.g., including virtual machines and virtual functions) of a host which is communicatively coupled to the device (e.g., a storage device). The retrieving and execution are based on command pool tracking and throughput pool tracking. As referred to herein, device throughput includes bandwidth (BW) and number of input/output operations per second (IOPS), and throughput pool tracking includes tracking the combination of bandwidth and IOPS capabilities. Command execution may be managed on multiple virtual entities (VEs) that are operating on a single device to provide improved resource management (e.g., computational efficiency) while meeting quality of service (QoS) (e.g., speed/reliability) and tenant fairness (e.g., equitable allocation of bandwidth) requirements in a multi-tenant system.

In accordance with the present disclosure, storage device throughput may be managed while retrieving, prioritizing, and executing commands received from a host coupled to the storage device. The device (e.g., a solid-state drive (SSD) device) includes system memory, which includes temporary storage for storing commands (e.g., queue groups) received from the host, and persistent storage media, which may include memory blocks with pages or super pages of memory. Devices and methods disclosed herein may use firmware of the device along with processing circuitry (e.g., including arbitration circuitry) to manage the retrieval and execution of commands received from the host. By managing the retrieval and execution of the received commands, workload balancing is provided with suitable processing latency and without quality of service (QoS) degradation. The suitable processing latency and lack of QoS degradation improves the performance (e.g., speed and efficiency) of a device that retrieves and processes the commands. The commands may include any desired number of read or write requests, including direct memory access (DMA) commands.

The device (e.g., SSD device) may include processing circuitry which determines, for each queue set, a priority, a command limit for the number of commands to retrieve, a number of outstanding commands, a throughput limit based on the priority and on a capability of the device, a required throughput to be used in connection with the outstanding commands, whether the command limit is greater than the number of outstanding commands. and whether the throughput limit is greater than the required throughput. based on determining that the command limit is greater than the number of outstanding commands and that the throughput limit is greater than the required throughput, the processing circuitry retrieves the outstanding commands, reserves at least a portion of the required throughput, and executes the retrieved outstanding commands using at least the reserved required throughput.

In some embodiments, the host includes at least one virtual entity to receive at least one command from a client application.

In some embodiments, the processing circuitry further designates each queue set of the plurality of queue sets as available based on determining that the respective command limit is greater than the respective number outstanding commands for each respective queue set of the plurality of queue sets.

In some embodiments, the device further includes persistent storage media and at least one available command execution queue, where each available command execution queue corresponds to a queue set of the plurality of queue sets and each available command execution queue is configured to store at least one of the retrieved outstanding commands. The processing circuitry, based on designating the queue set as an available queue set, further selects a command execution queue from the at least one available command execution queue, accesses at least one command from the selected command execution queue, and executes the accessed command.

In some embodiments, the throughput limit and the required throughput are each associated with a respective bandwidth (BW) limit and required bandwidth for retrieving commands and a respective number of input/outputs per second (IOPS) limit and required IOPS associated with the retrieving.

In some embodiments, the processing circuitry further determines, for each queue set of the plurality of queue sets, a respective first set of values indicative of the respective bandwidth limit associated with the respective throughput limit and of the respective required bandwidth associated with the respective required throughput, a respective second set of values indicative of the respective IOPS limit associated with the respective throughput limit and of the respective required IOPS associated with the respective required throughput, and causes to be executed the respective retrieved commands for each of the plurality of queue sets based on the respective first set of values and on the respective second set of values.

In some embodiments, the command limit is based on a command pool, the throughput limit is based on a throughput pool, and the command pool and the throughput pool is shared by at least one queue set of the plurality of queue sets.

In some embodiments, in response to determining that the command limit is less than the number of outstanding commands, the processing circuitry further delays the retrieving of the outstanding commands until the command limit is increased, and based on determining that the throughput limit is less than the required throughput, the processing circuitry further delays the reserving of the required throughput until the throughput limit is increased.

In some embodiments, the processing circuitry further determines an amount of traffic on at least one virtual entity of the host, and the throughput limit is further based on the amount of traffic.

In some embodiments, the processing circuitry, for each retrieved outstanding command, further generates a response based on the respective retrieved outstanding command, and based on the response, updates the command limit, the number of outstanding commands, the throughput limit, and the required throughput.

In some embodiments, each queue set of the plurality of queue sets includes a respective submission queue and a respective completion queue, where the submission queue stores a command received from at least on virtual entity of the host, and the completion queue stores at least one response generated based on at least one of the retrieved outstanding commands.

In some embodiments, either of the managing of command allocation (e.g., by the processing circuitry) or the managing of throughput (i.e., BW/IOPS credit) pool allocation (e.g., by the arbitration circuitry) may be independently implemented as follows. For example, one of the command allocation or throughput pool allocation may be independently implemented, and then the other one of the command allocation or throughput pool allocation may be implemented based on the independent implementation.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

Figure 1:
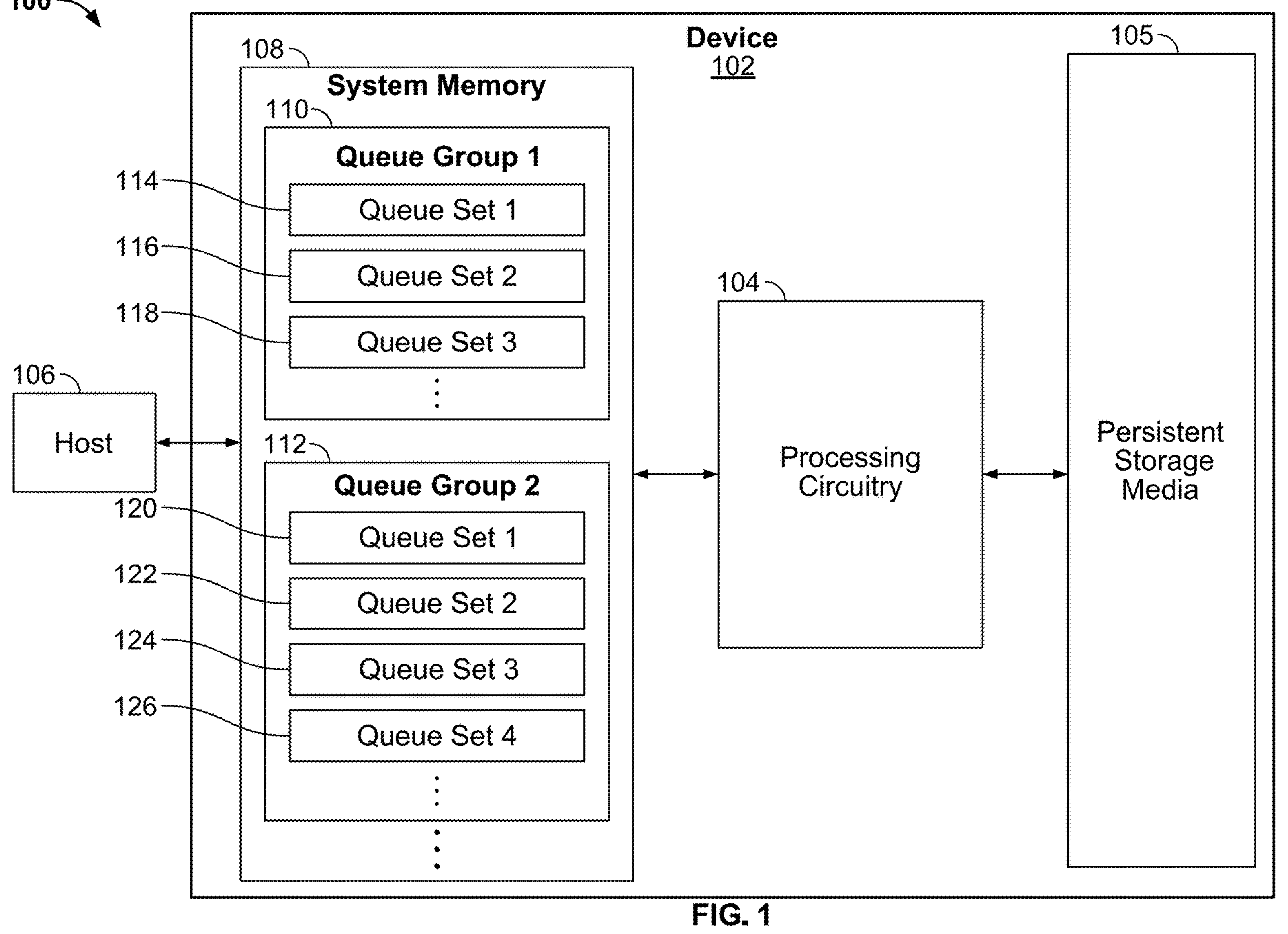
FIG. 1 shows a diagram of a system that includes a host and a device with processing circuitry and system memory, in accordance with some embodiments of the present disclosure.

In accordance with the present disclosure, devices and methods are provided for managing the retrieving (i.e., fetching) and execution of commands from virtual entities (e.g., virtual machines) of a host which is communicatively coupled to the device (e.g., a storage device). The retrieving and execution are based on command pool tracking and throughput pool tracking (e.g., tracking a combination of bandwidth and input/output per second (IOPS) capabilities, e.g., which may be valued according to a credit system). Multiple virtual entities may be coupled to a single device that executes commands of applications running on the virtual entities, thereby providing improved resource management (e.g., reduction in number of devices required) while meeting quality of service (QoS) and tenant fairness (e.g., bandwidth fairness) requirements in a multi-tenant system.

A device (e.g., an SSD device) provided for executing methods of this disclosure includes system memory and processing circuitry. The processing circuitry may include arbitration circuitry, command fetch circuitry (e.g., for retrieving commands), and command execution circuitry. The system memory includes temporary storage for commands (e.g., queue groups) from the host. The device and method disclosed herein may use firmware of the device along with the processing circuitry to select a virtual entity from which to retrieve commands, command fetch circuitry to retrieve commands from a queue group associated with the selected virtual entity, and processing circuitry to execute the retrieved commands from the host. The commands may include any suitable number of read or write requests, including direct memory access (DMA) commands.

The processing circuitry of the device may evaluate each respective queue group stored in the system memory. To evaluate a respective queue group, the processing circuitry determines a command limit (e.g., based on a priority of the queue group and optionally based on other traffic on the device) indicative of a number of commands that are capable of being retrieved from the respective queue set, determines a number of outstanding commands to be retrieved from the respective queue set, determines a throughput limit (e.g., based on a priority of the queue group and optionally based on other traffic on the device), determines a required throughput which can be used for the outstanding commands, compares the command limit to the number of outstanding commands to be retrieved for the respective queue set, and compares the required throughput to the throughput limit to determine whether to designate the respective queue set as an available queue set. In some embodiments, each queue group of the system memory includes a submission queue to temporarily store the commands received from the host, and a completion queue to store responses to command retrieval operations. After each respective queue group has been evaluated, the processing circuitry selects a queue group from the available queue groups and retrieves at least one command from the selected queue group. In some embodiments, processing circuitry generates a command retrieval request and transmits the command retrieval request to the system memory. In some embodiments, at least one command from the selected queue group is sent to the processing circuitry by using a command retrieval response, which includes information of at least one retrieved command.

In some embodiments, the device (e.g., a storage device) is provided with persistent storage media and processing circuitry that are communicatively coupled to each other. In some embodiments, the processing circuitry includes at least one command execution queue to temporarily store fetched commands prior to execution. Each respective command execution queue is configured to store commands which have been fetched, by processing circuitry, from a corresponding queue group of system memory. In some embodiments, the processing circuitry includes a processor to execute commands, providing general processing capabilities for the device, to access persistent storage media and to fetch commands from system memory. In some embodiments, the processing circuitry accesses commands from at least one of the command execution queues to execute the commands. In such embodiments, the processing circuitry is to determine available command execution queues based on whether a respective number of commands in the respective command execution queue exceeds a threshold. When the processing circuitry determines that the number of commands in the respective command execution queue exceeds the threshold, the processing circuitry designates the respective command execution queue as an available command execution queue. The processing circuitry then selects a command execution queue from the available command execution queues in order to access at least one command from the selected command execution queue. In some embodiments, the command is a read command, which includes a memory address from which to access read data in the persistent storage media. In other embodiments, the command is a write command, which includes write data and a memory address at which to store the write data in persistent storage media.

In some embodiments, the processing circuitry includes a processor and a memory controller. The memory controller may include command execution queues, each of which corresponds to a respective queue group in system memory from which commands are fetched, each command execution queue is configured to temporarily store commands until the data the processing circuitry accesses the fetched commands. In some embodiments, the processor of the processing circuitry may be a highly parallelized processor capable of handling high bandwidths of incoming commands quickly (e.g., by starting simultaneous processing of commands before completion of previously received commands). In some embodiments, the processor is to execute commands concurrently and independently with respect to the memory controller processing command from the host.

The virtual machines of the host communicatively coupled to the device may include commands of varying size, which when paired with command bursts when the device fetches commands, may result in unfair command fetching arbitration. The management of fetching arbitration disclosed herein improves the accounting of processing resources and processing bandwidth resources allocated to fetch commands from each virtual machine of the host.

The device (e.g., SSD device) may include arbitration circuitry, which, for each respective virtual machine of the host, determines a first credits value indicative of a number of commands that are capable of being fetched from a queue group associated with the respective virtual machine and determines a second credits value indicative of a bandwidth for fetching at least one command from the queue group associated with the respective virtual machine. In some embodiments, each queue group associated with a respective virtual machine includes a submission queue to temporarily store the commands of the host, and a completion queue to store command fetch responses. Once the first credits value and the second credits value for each virtual machine of the host has been determined, the arbitration circuitry is further to select a virtual machine based on at least one of the first credits value and the second credits value for each of virtual machines of the host, and communicate a signal to the command fetch circuitry to fetch at least one command from a queue group associated with the selected virtual machine. In some embodiments, command fetch circuitry generates a command fetch request and transmits the command fetch request to the system memory. The device also includes command fetch circuitry communicatively coupled to the arbitration circuitry, where the command fetch circuitry receives the signal from the arbitration circuitry, and in response to the reception of the signal, fetches at least one command from the queue group associated with the selected virtual machine and communicates the at least one fetched command to processing circuitry of the device for execution. In some embodiments, at least one command from the selected queue group is sent to the processing circuitry by using a command fetch response, which includes at least one fetched command. In some embodiments, the command is a read command, which includes a memory address from which to access read data in the memory of the device. In other embodiments, the command is a write command, which includes write data and a memory address at which to store the write data in the memory.

For purposes of brevity and clarity, the features of the disclosure described herein are in the context of a device (e.g., an SSD device) having arbitration circuitry, command fetch circuitry, processing circuitry and memory. In some embodiments, each of the arbitration circuitry and command fetch circuitry is part of the processing circuitry. The principles of the present disclosure may be applied to any other suitable context for a device that manages the fetching arbitration of commands from virtual machines of a host. The device may include processing circuitry and persistent storage media, which are communicatively coupled to each other by a data bus or interface. In some embodiments, the commands are fetched from the host to the device via a network bus or interface.

In some embodiments, each of the arbitration circuitry, command fetch circuitry, and processing circuitry includes a processor. In some embodiments, processing circuitry includes a memory controller. In some embodiments, each processor of the arbitration circuitry, command fetch circuitry, and processing circuitry may be a highly parallelized processor capable of handling high bandwidths of incoming commands and signals quickly. For example, the processing circuitry may start simultaneous processing of commands before completion of previously fetched commands. In some embodiments, the processor is to execute commands concurrently and independently with respect to the memory controller processing command from the virtual machines of the host.

In particular, the present disclosure provides devices and methods that implement traffic shaping by combining command tracking and throughput tracking to coordinate command retrieval and execution. In some embodiments, throughput pools may be mapped to virtual entities (VEs), and command pools may be mapped to priority domains (PDs). The throughput pool may include an allocation of available BW and/or IOPS (e.g., which may be assigned respective credit values and may then be quantified/allocated according to a single scale). For example, there may be a first set of bandwidth credits and a second set of IOPS credits, or there may be a lumped credits value that includes both BW and IOPS availability. The throughput pool may use such a credit-based system to allocate available physical resources across multiple queue sets and/or virtual entities. In some embodiments, a queue set (QS) may be mapped to a unique combination of a VE and a PD to provide generalized traffic shaping. This generalized traffic shaping allows a group of QSs to share a single throughput pool that is mapped to one VE, while another group of QSs can share a single command pool that is mapped to one PD. This method provides a generalized approach for managing Quality of Service (QoS) and maintaining tenant fairness during VE operation. The improved hardware resource management between virtual entities results in an improved performance speed and efficiency of devices used to manage, retrieve, and execute commands.

The persistent storage media of the device may be referred to as the main memory of the device. In some embodiments, the main memory of the device disclosed herein may contain any of the following memory densities: single-level cells (SLCs), multi-level cells (MLCs), triple-level cells (TLCs), quad-level cells (QLCs), penta-level cells (PLCs), and any suitable memory density that is greater than five bits per memory cell.

In some embodiments, the device and methods of the present disclosure may refer to a storage device (e.g., an SSD device) which is communicatively coupled to a host (e.g., host devices) by a network bus or interface. In some embodiments, the device is communicatively coupled to more than one host, and each host may send commands for the device to receive and execute.

An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and includes a type of non-volatile storage technology. Quality of Service (QoS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-15.

FIG. 1 shows a diagram of a system 100 that includes a host 106 and a device 102 with processing circuitry 104 and system memory 108, in accordance with some embodiments of the present disclosure. In some embodiments, device 102 may be a storage device such as a solid-state storage device (e.g., an SSD device). In some embodiments, processing circuitry 104 may include a processor or any suitable processing unit. In some embodiments, persistent storage media 105 may include non-volatile memory. It will be understood that the embodiments of the present disclosure are not limited to SSDs. For example, in some embodiments, device 102 may include a hard disk drive (HDD) device in addition to or in place of an SSD. In some embodiments, system memory 108 may be implemented as temporary memory (e.g., cache or any suitable volatile memory) including queue groups (e.g., first queue group 110 and second queue group 112) which include at least one queue set (e.g., 114, 116, 118, 120, 124, 126) to store commands received from host 106.

Device 102 is configured to receive commands from host 106 and store the commands in system memory 108. System memory 108 is divided into queue groups (e.g., first queue group 110 and second queue group 112), each of which includes at least one queue set (e.g., 114, 116, 118, 120, 124, 126). In some embodiments, each queue set (e.g., 114, 116, 118, 120, 124, 126) includes a submission queue at which to receive and store the received commands from host 106, and a completion queue to store command fetch responses. In some embodiments, a respective command received from host 106 may be stored in a queue group (e.g., first queue group 110 and second queue group 112) based on any one or more of (a) characteristics of the respective command (e.g., type of command and size of command), (b) workload priority associated with the respective command, and (c) frequency at which command is received by device 102. For example, first queue group 110 and its respective queue sets (e.g., 114, 116, and 118) may be configured to receive and store high priority commands from host 106 and second queue group 112 and its respective queue sets (e.g., 120, 122, 124, and 126) are configured to receive and store low priority commands from host 106.

The number of queue groups (e.g., first queue group 110 and second queue group 112) and their respective queue sets (e.g., 114, 116, 118, 120, 124, 126) may be allocated according to any one or more of (a) characteristics of the commands (e.g., type of command and size of command), (b) workload priority associated with the commands, (c) frequency at which commands are received, and (d) available memory of system memory 108. For example, the first queue group 110 may be configured to receive less-frequent, high priority commands from host 106 and the second queue group 112 may be configured to receive more-frequent, low priority commands from host 106. In such an example, the available memory of system memory 108 may be allocated such that the second queue group 112 includes more queue sets than the first queue group 110. In some embodiments, each queue set (e.g., 114, 116, 118, 120, 124, 126) may be of the same allocated memory size. In some embodiments, each queue set (e.g., 114, 116, 118, 120, 124, 126) may be of variable allocated memory size, i.e., some selected queue sets may be of a larger allocated memory size than other queue sets. Although the aforementioned examples described herein and FIG. 1 illustrates system memory 108 with two queue groups (e.g., first queue group 110 and second queue group 112), system memory 108 may include more than two queue groups. Furthermore, although FIG. 1 illustrates each queue group (e.g., first queue group 110 and second queue group 112) with three or four queue sets (e.g., 114, 116, 118, 120, 124, 126), each queue group may include one or more queue sets based on the size of queue sets and the available memory that may be allocated in system memory 108.

In some embodiments, system memory 108 is volatile memory, which may include any one or more volatile memory, such as Static Random Access Memory (SRAM). In some embodiments, volatile memory is configured to temporarily store data (e.g., commands received from host 106 and command fetch responses) while processing circuitry 104 continues to fetch and process commands. In some embodiments, processing circuitry 104 is communicatively coupled to volatile memory to store and access commands received from host 106. In some embodiments, a data bus interface is used to transport commands or command data from volatile memory to processing circuitry 104.

Although FIG. 1 shows each queue group (e.g., first queue group 110 and second queue group 112) in system memory 108, in some embodiments each queue group (e.g., 110 and 112) and each queue set (e.g., 114, 116, 118, 120, 122, 124, and 126), and the associated data (e.g., commands and command fetch responses) of the queue sets are stored in host 106. In some embodiments, host 106 includes host memory to store each queue group (e.g., 110 and 112), their respective queue sets (e.g., 114, 116, 118, 120, 122, 124, and 126) and the associated data (e.g., commands and command fetch responses). In such embodiments, processing circuitry 104 may fetch commands stored in host memory of host 106 in a similar manner to as to fetch commands stored in system memory 108 of the device 102 discussed herein.

The processing circuitry 104 is configured to manage the fetching of commands received from host 106. Processing circuitry 104 is configured to determine an allocated command value indicative of a number of commands that are capable of being fetched from each respective queue group (e.g., 110 and 112). In some embodiments, the allocated command value of a queue group (e.g., 110 and 112) is determined based on an amount of processing resources allocated for fetching commands from each queue group (e.g., 110 and 112). The allocated command value for each queue group (e.g., 110 and 112) may be preset before device 102 receives commands from host 106. In some embodiments, the allocated command value is represented by a number of commands of a particular size in the queue group (e.g., 110 and 112) from which the processing circuitry 104 may fetch commands. In some embodiments, the allocated command value may be indicative of the amount of bandwidth that the processing circuitry 104 is allocated to fetch commands from a respective queue group (e.g., 110 and 112). The allocated command value for a respective queue group (e.g., 110 and 112) is a share of a total command allocation capacity, which is defined as a sum of each allocated command value for each queue group in system memory 108. In some embodiments, each respective queue group (e.g., first queue group 110 and second queue group 112) is allocated with the same allocated command value. In some embodiments, one or more queue groups (e.g., 110 and 112) may have a greater allocated command value than other queue groups in the same system memory 108. In some embodiments, the allocated command value for a respective queue group (e.g., 110 and 112) is updated while the device is in operation, where the allocated command value is updated based on the volume of commands received and stored in the respective queue group (e.g., 110 and 112) or the frequency of receiving commands stored in the respective queue group (e.g., 110 and 112). In some embodiments, the processing circuitry 104 allocates a shared allocated command value in order for the processing circuitry 104 to fetch additional commands from any one or more respective queue group (e.g., 110 and 112), in addition to the allocated command value for each of the one or more respective queue group. The processing circuitry 104 is further configured to determine a number of outstanding commands to be fetched from each respective queue group (e.g., first queue group 110 and second queue group 112). In some embodiments, the number of outstanding commands to be fetched from a respective queue group is determined based on information of at least one command fetch request sent from the processing circuitry 104 to the respective queue group (e.g., 110 and 112). The number of outstanding commands to be fetched may be determined by determining the number of commands stored in queue sets (e.g., 114, 116, 118, 120, 122, 124, and 126) of the respective queue groups (e.g., 110 and 112) which have yet to be fetched but have been included in a command fetch request sent from the processing circuitry 104. In some embodiments, the number of outstanding commands to be fetched may be represented by a number of commands of a particular size in the queue group (e.g., 110 and 112). In some embodiments, the number of outstanding commands to be fetched may be indicative of the amount of bandwidth required to fetch the outstanding commands from the queue group (e.g., 110 and 112) by the processing circuitry 104 based on the data size of the outstanding commands to be fetched. As processing circuitry 104 generates and sends command fetch requests to the system memory 108 to fetch commands from a respective queue group (e.g., 110 and 112), the associated number of outstanding commands to be fetched from the respective queue group (e.g., 110 and 112) increases. In some embodiments, the increase in the outstanding number of commands to be fetched may be based on one or more of the number of commands included in the command fetch requests, the number of commands stored in the respective queue group (e.g., 110 and 112), and the size of the commands stored in the respective queue group (e.g., 110 and 112). Once an outstanding command is fetched from a queue set (e.g., 114, 116, 118, 120, 122, 124, 120) of a respective queue group (e.g., 110 and 112), the associated number of outstanding commands to be fetched from the respective queue group decreases. In some embodiments, this decrease in the outstanding number of commands to be fetched may be based on one or more of the number of commands fetched by the processing circuitry 104 and the size of each command fetched. Once the processing circuitry 104 determines the number of outstanding commands to be fetched from queue group (e.g., 110 and 112), processing circuitry 104 then compares the allocated command value to the number of outstanding commands to be fetched for each respective queue group (e.g., 110 and 112).

The processing circuitry 104 is further configured to compare the allocated command value to the number of outstanding commands to be fetched for the respective queue group (e.g., first queue group 110 and second queue group 112). In some embodiments, when comparing the allocated command value of a respective queue group (e.g., 110 and 112) to the number of outstanding commands to be fetched for the respective queue group (e.g., 110 and 112), the processing circuitry 104 includes at least a portion of the shared allocated command value to the allocated command value of the respective queue group (e.g., 110 and 112). When the processing circuitry 104 determines that the allocated command value is greater than the number of outstanding commands to be fetched for the respective queue group (e.g., 110 and 112), based on the comparison, the processing circuitry 104 designates the respective queue group (e.g., 110 and 112) as an available queue group. The processing circuitry 104 is configured to designate the respective queue group (e.g., 110 and 112) as an available queue group of at least one available queue groups from which at least one command may be fetched. In some embodiments, the respective queue group (e.g., 110 and 112) is designated as an available queue group from which at least one command may be fetched by using a lookup table or any suitable bit mapping to indicate which queue group is available for processing circuitry to send command fetch requests. In some embodiments the lookup table or suitable bit mapping are located in processing circuitry 104. In other embodiments the lookup table or suitable bit mapping are located in system memory 108. When the processing circuitry 104 determines that the allocated command value is less than or equal to the number of outstanding commands to be fetched for the respective queue group (e.g., 110 and 112), processing circuitry 104 will not designate the respective queue group as an available queue group as it does not have any available processing resources to fetch commands from the respective queue group (e.g., 110 and 112). If there are any further queue groups (e.g., 110 and 112) which have not been evaluated by processing circuitry 104, the processing circuitry will evaluate each remaining queue group to determine whether each remaining queue group should be designated as an available queue group.

Once each of the queue groups (e.g., 110 and 112) have been evaluated and at least one queue group has been designated as an available queue group, the processing circuitry 104 is further configured to select a queue group from the available queue groups. In some embodiments, the selection is performed randomly, or in a round-robin manner. In some embodiments, the selection may be based on, in part, a respective priority of each available queue group. In some embodiments, the processing circuitry selects a queue group from the available queue groups based on an associated priority of each available queue group. The processing circuitry 104 then fetches at least one command from the selected queue group. In some embodiments, the processing circuitry 104 sends at least one command fetch request to the system memory 108 to fetch at least one command from the selected queue group. In some embodiments, the processing circuitry 104 fetches at least one command from at least one of the queue sets (e.g., 114, 116, 118, 120, 122, 124, 126) of the selected queue group. In some embodiments, the queue sets (e.g., 114, 116, 118, 120, 122, 124, 126) of the selected queue group from which commands are fetched are determined based on any one or more of associated queue set priorities, the amount of commands stored in each queue set (e.g., 114, 116, 118, 120, 122, 124, 126), or the amount of data stored in each queue set (e.g., 114, 116, 118, 120, 122, 124, 126). The processing circuitry 104 fetches commands which are stored in the submission queue of queue sets (e.g., 114, 116, 118, 120, 122, 124, 126) within the selected queue group. Once a command is fetched from the submission queue, the system memory 108 generates a command fetch response which includes at least one fetched command. The command fetch response may be stored in the corresponding completion queue of the queue set from which the command was fetched. The command fetch response is than sent to the processing circuitry 104 to execute the at least one fetched command. In some embodiments, the command included in the command fetch response is a read command, which includes a memory address from which to access read data in the persistent storage media 105. In other embodiments, the command included in the command fetch response is a write command, which includes write data and a memory address at which to store the write data in persistent storage media 105.

For purposes of brevity and clarity, the features of the disclosure described herein are in the context of a device 102 (e.g., an SSD device) having processing circuitry 104 and system memory 108. However, the principles of the present disclosure may be applied to any other suitable context in which a device receives and stores commands from a host and fetches the commands for execution. The device 102 may include processing circuitry 104 and system memory 108, which are communicatively coupled to each other by network buses or interfaces. In some embodiments, the device receives commands from a host 106 through a port. In some embodiments, the device may receive commands from multiple hosts. In some embodiments, the commands are sent from any of the hosts (e.g., host 106) to the device via a network bus or interface.

Device 102 receives commands from host 106 through a port, where the host and the port are communicatively coupled by the network bus. The network bus may transport commands and data between host 106 and device 102. The network bus may transport commands and data using a Non-Volatile Memory Express (NVMe), Peripheral Component Interconnect Express (PCIe), or any other suitable network protocol.

Additionally, device 102 includes persistent storage media 105. Persistent storage media 105 may also be hereinafter referred to as main memory of device 102. In some embodiments, persistent storage media 105 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, persistent storage media 105 includes memory of a memory density, the memory density is any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. Processing circuitry 104 is communicatively coupled to persistent storage media 105 to store and access data in memory blocks or pages of persistent storage media 105. In some embodiments, a data bus interface is used to transport data transfer requests or data. In some embodiments, the data bus interface includes a data transfer request bus and a data interface. In some embodiments, persistent storage media 105 includes multiple memory die. In some embodiments, persistent storage media 105 includes multiple bands of memory, each band spanning across each memory die. In some embodiments, persistent storage media 105 may be accessed (e.g., read or written to) using direct memory access (DMA) by the processing circuitry 104. In such embodiments, the processing circuitry 104 includes a processor to fetch and execute commands, and a memory controller (e.g., a DMA controller) to process and perform DMA transfers independent of the execution of instructions by the processor.

In some embodiments, the processor or processing unit of processing circuitry 104 may include a hardware processor, a software processor (e.g., a processor emulated using a virtual machine), or any combination thereof. The processor may include any suitable software, hardware, or both for controlling system memory 108, persistent storage media 105, and processing circuitry 104 while fetching and executing commands. In some embodiments, device 102 may further include a multi-core processor. In some embodiments, processing circuitry 104 includes a memory controller (e.g., direct memory access (DMA) controller), which may include any suitable software, hardware, or both for accessing persistent storage media 105 independent of the processor which fetches and executes commands. Persistent storage media 105 may also include hardware elements for non-transitory storage of instructions, commands, or requests.

In some embodiments, device 102 may be a storage device (for example, SSD device) which may include one or more packages of memory dies (e.g., persistent storage media 105), where each die includes storage cells. In some embodiments, the storage cells are organized into pages or super pages, such that pages and super pages are organized into blocks. In some embodiments, each storage cell can store one or more bits of information.

For purposes of clarity and brevity, and not by way of limitation, the present disclosure is provided in the context of managing the fetching and execution of commands received from a host. The process of managing the fetching and execution of commands received from a host may be configured by any suitable software, hardware, or both for implementing such features and functionalities. Managing the fetching and execution of commands received from a host may be at least partially implemented in, for example, device 102 (e.g., as part of processing circuitry 104, or any other suitable device). For example, for a solid-state storage device (e.g., device 102), managing the fetching and execution of commands received from a host may be implemented in processing circuitry 104. Managing the fetching and execution of commands received from a host may reduce processing latency for certain (e.g., high priority) commands and reduce QoS degradation. The reduced processing latency for certain commands and reduced QoS degradation results in an improved performance speed of device 102 to fetch commands and process commands to access persistent storage media 105 while processing circuitry 104 concurrently executes commands.

Figure 2:
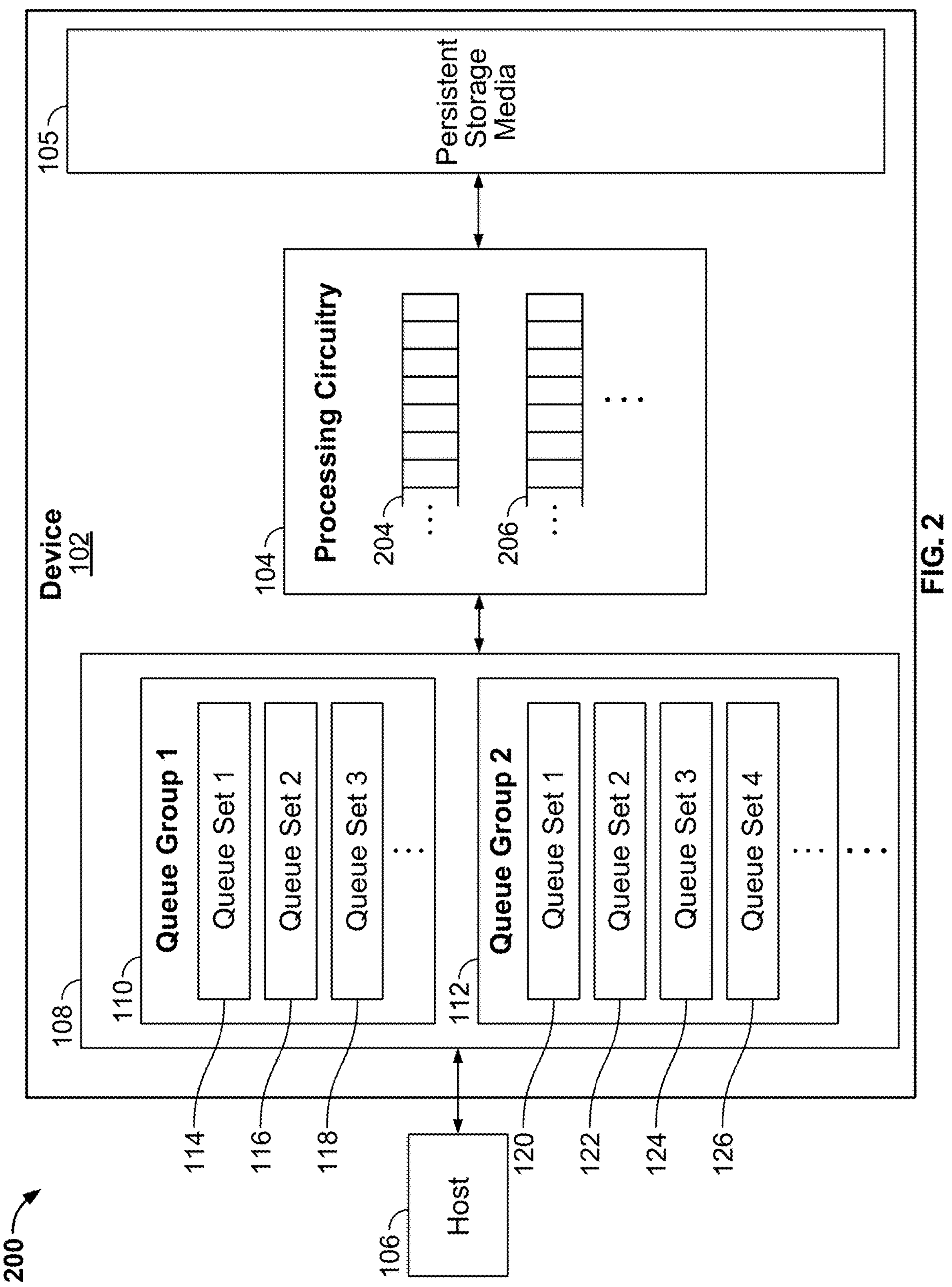
FIG. 2 shows a diagram of an implementation of the device of FIG. 1 including command execution queues, in accordance with some embodiments of the present disclosure.

FIG. 2 shows a diagram of another implementation of the device 102 of FIG. 1 with command execution queues (e.g., first command execution queues 204 and second command execution queue 206), in accordance with some embodiments of the present disclosure. Once processing circuitry 104 fetches a command from a respective queue group (e.g., 110 and 112), the fetched command is temporarily stored in a command execution queue (e.g., 204 and 206) until processing circuitry 104 accesses at least one command from the command execution queue (e.g., 204, 206) for execution. Although FIG. 2 shows two command execution queues (e.g., 204 and 206), device 102 may include more than two command execution queues. The first command execution queue 204 is associated with the first queue group 110, and the second command execution queue 206 is associated with the second queue group 112. For each respective additional queue group (e.g., a third queue group), device 102 includes a corresponding additional command execution queue (e.g., a third command execution queue). Each respective command execution queue (e.g., 204 and 206) is configured to temporarily store fetched commands from a queue group (e.g., 110 and 112) which corresponds to the respective command execution queue (e.g., 204 and 206). In some embodiments, command execution queues (e.g., 204 and 206) are implemented in processing circuitry 104. In some embodiments, command execution queues (e.g., 204 and 206) may be implemented as any first-in first-out data structure (e.g., queue).

Processing circuitry 104 is configured to determine whether a respective number of commands in the respective command execution queue (e.g., first command execution queue 204 and second command execution queue 206) exceeds a threshold. In some embodiments the threshold value may be configured based on a constant threshold value for each command execution queue (e.g., 204 and 206). In some embodiments, each command execution queue (e.g., 204 and 206) has a respective threshold, where each respective threshold is not necessarily the same value. In some embodiments, the threshold of a respective command execution queue (e.g., 204 and 206) is determined based on an amount of processing resources allocated for executing commands from the queue group (e.g., 110 and 112) associated with the respective command execution queue (e.g., 204 and 206). The threshold for each command execution queue (e.g., 204 and 206) may be preset before the device 102 receives commands from host 106. In some embodiments, the threshold may be represented by a number of commands of a particular size in the command execution queue (e.g., 204 and 206) from which the processing circuitry 104 may access a command for execution. In some embodiments, the threshold may be indicative of the amount of data stored in a respective command execution queue (e.g., 204 and 206) at which the processing circuitry 104 should pause accessing commands for execution. The threshold for a respective command execution queue (e.g., 204 and 206) may be determined by a share of a total processing resources for executing commands, which is defined by the processing capabilities of a processor or a memory controller (e.g., DMA controller) of the processing circuitry 104.

In some embodiments, each respective command execution queue (e.g., 204 and 206) is allocated with the same amount of processing resources, and therefore the same threshold is implemented within each command execution queue (e.g., 204 and 206). In some embodiments, one or more command execution queue may have a greater threshold than other command execution queues. The processing circuitry 104 compares the number of commands stored in the respective command execution queue (e.g., 204 and 206) to determine whether a respective number of commands in the respective command execution queue (e.g., 204 and 206) exceeds the respective threshold of the respective command execution queue (e.g., 204 and 206). As processing circuitry 104 accesses commands from a respective command execution queue (e.g., 204 and 206), the number of commands stored in the respective command execution queue (e.g., 204 and 206) decreases by the number of commands accessed. As more commands are fetched, by processing circuitry 104, from a queue group (e.g., 110 and 112) that corresponds to the respective command execution queue (e.g., 204 and 206), the number of commands stored in the respective command execution queue (e.g., 204 and 206) increase by the number of commands fetched. When the respective number of commands in the respective command execution queue (e.g., 204 and 206) does not exceed the threshold, processing circuitry designates the respective command execution queue (e.g., 204 and 206) as an available command execution queue. The processing circuitry 104 is configured to designate the respective command execution queue (e.g., 204 and 206) as an available command execution queue of at least one available command execution queues from which at least one command may be accessed for execution. In some embodiments, the respective command execution queue (e.g., 204 and 206) is designated as an available command execution queue from which at least one command may be accessed by using a lookup table or any suitable bit mapping to indicate which command execution queue is available for processing circuitry to access commands for execution. In some embodiments, when the respective number of commands in the respective command execution queue (e.g., 204 and 206) exceeds the threshold, the processing circuitry 104 pauses accessing commands stored in the respective command execution queue (e.g., 204 and 206), as to reduce strain on processing resources allocated for the respective command execution queue (e.g., 204 and 206) for executing commands. If there are any further command execution queues (e.g., 204 and 206) which have not been evaluated by processing circuitry 104, the processing circuitry will evaluate each remaining command execution queue to determine whether each remaining command execution queue should be designated as an available command execution queue.

Once each of the command execution queues (e.g., 204 and 206) has been evaluated and at least one command execution queue has been designated as an available command execution queue, the processing circuitry 104 is further configured to select a command execution queue group from the available command execution queue. The processing circuitry 104 selects a command execution queue (e.g., 204 and 206) from the available command execution queues. In some embodiments, the selection is random, or based on a round-robin method. In some embodiments, the selection may be based on, in part, a respective priority of each available command execution queue. In some embodiments, the selection is performed randomly, or in a round-robin manner. In some embodiments, the selection may be based on, in part, a respective priority of each available command execution queue. In some embodiments, the processing circuitry 104 is configured to select a command execution queue (e.g., 204 and 206) from the available command execution queues based on an associated priority of each available command execution queue. Once the processing circuitry 104 selects the command execution queue, the processing circuitry 104 accesses at least one command from the selected command execution queue. When a command is accessed from the selected command execution queue, the processing circuitry causes the command to be executed. As processing circuitry 104 accesses commands from a respective command execution queue (e.g., 204 and 206), the number of commands stored in the respective command execution queue (e.g., 204 and 206) decreases by the number of commands accessed. In some embodiments, the processing circuitry 104 includes a multi-core processor, which executes accessed commands in parallel. In some embodiments, at least one accessed command is a DMA command, which is executed by a DMA controller or any other suitable, standalone processor to execute the DMA command.

Figure 3:
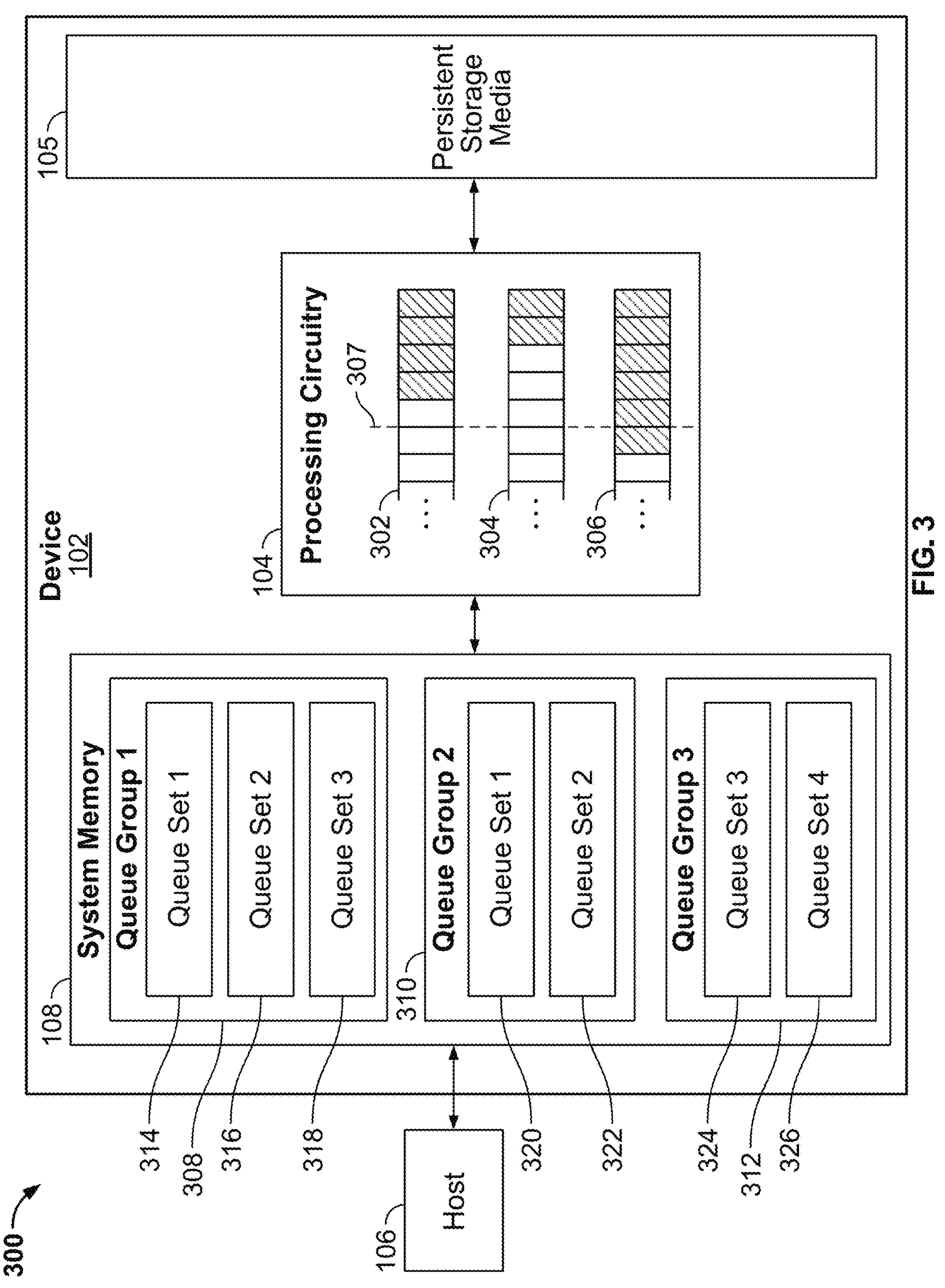
FIG. 3 shows a diagram of an implementation of the device of FIG. 2 for managing example commands received from the host, in accordance with some embodiments of the present disclosure.

FIG. 3 shows a diagram of an implementation of the device of FIG. 2 managing example commands received from the host, in accordance with some embodiments of the present disclosure. In the example device 102 provided in FIG. 3, system memory 108 includes a first queue group 308 including three queue sets (e.g., 314, 316, and 318), a second queue group 310 including two queue sets (e.g., 320 and 322), and a third queue group 312 including queue sets (e.g., 324 and 326). Therefore, the processing circuitry 104 is implemented with three command execution queues (e.g., first command execution queue 302, second command execution queue 304, and third command execution queue 306). Each command execution queue (e.g., 302, 304, 306) includes threshold 307.

In some embodiments the threshold 307 may be configured based on a constant threshold value for each command execution queue (e.g., 302, 304, and 306). In some embodiments, each command execution queue (e.g., 302, 304, and 306) has a respective threshold (e.g., threshold 307), where each respective threshold is not necessarily the same value. In some embodiments, the threshold 307 of a respective command execution queue (e.g., 302, 304, 306) is determined based on an amount of processing resources allocated for executing commands from the queue group (e.g., 308, 310, 312) associated with the respective command execution queue (e.g., 302, 304, 306). In some embodiments, the threshold 307 may be represented by a number of commands of a particular size in the command execution queue (e.g., 302, 304, 306) from which the processing circuitry 104 may access a command for execution. In some embodiments, the threshold 307 is indicative of the amount of data stored in a respective command execution queue (e.g., 302, 304, 306) at which the processing circuitry 104 should pause accessing commands for execution. The threshold 307 for a respective command execution queue (e.g., 302, 304, 306) may be determined by a share of a total processing resources for executing commands, which is defined by the processing capabilities of a processor or a memory controller (e.g., DMA controller) of the processing circuitry 104. In some embodiments, each respective command execution queue (e.g., 302, 304, 306) is allocated with the same amount of processing resources, and therefore the same threshold 307 is implemented within each command execution queue (e.g., 302, 304, 306). In some embodiments, one or more command execution queue (e.g., 302, 304, 306) may have a greater threshold than other command execution queues.

For device 102 illustrated in FIG. 3, the first command execution queue 302 has four commands, the second command execution queue 304 has two commands, and the third command execution queue 306 has six commands. The threshold 307 for each of the command execution commands (e.g., 302, 304, and 306) is configured as five commands. The processing circuitry 104 evaluates each of the command execution queues (e.g., 302, 304, and 306) by comparing the respective number of commands in each command execution queue (e.g., 302, 304, and 306) to the threshold 307. Each of the first command execution queue 302 and the second command execution queue 304 includes fewer stored commands than the threshold 307, indicating that processing circuitry 104 has available processing resources to access and execute the commands stored in the first command execution queue 302 and second command execution queue 304. Processing circuitry 104 designates each of the first command execution queue 302 and second command execution queue 304 as available command execution queues from which processing circuitry 104 may access commands for execution. Processing circuitry 104 may also determine that the number of commands in third command execution queue 306 is greater than or equal to threshold 307, and therefore processing circuitry 104 pauses the accessing of commands stored in third command execution queue 306.

The processing circuitry 104 then selects a command execution queue from the available command execution queues (e.g., first command execution queue 302 and second command execution queue 304). In some embodiments, the selection is random, or based on a round-robin method. In some embodiments, the selection may be based on, in part, a respective priority of each available command execution queue (e.g., first command execution queue 302 and second command execution queue 304). For example, if the first queue group 308 and first command execution queue 302 are configured to store high priority commands, and the second queue group 310, second command execution queue 304, third queue group 312, and third command execution queue 306 are configured to store low priority commands, processing circuitry may access the commands of the first command execution queue 302 based on each respective priority of the command execution commands. In some embodiments, the selection is performed randomly, or in a round-robin manner. The processing circuitry 104 accesses at least one command from the first command execution queue 302. While processing circuitry 104 accesses commands in first command execution queue 302, processing circuitry may also fetch other commands from any one or more of the first queue group 308, second queue group 310, and third queue group 312 and store the commands in their respective corresponding command execution queue (e.g., 302, 304, 306). As processing circuitry 104 accesses commands from the first command execution queue 302, the number of commands stored in the first command execution queue 302 decreases by the number of commands accessed. Once the processing circuitry 104 has completed accessing commands stored in first command execution queue 302, or there are no longer any stored commands in the first command execution queue 302, processing circuitry may then reevaluate each of the command execution queues (e.g., 302, 304, and 306) to determine an updated set of available command execution queues to access further commands for execution.

Figure 4:
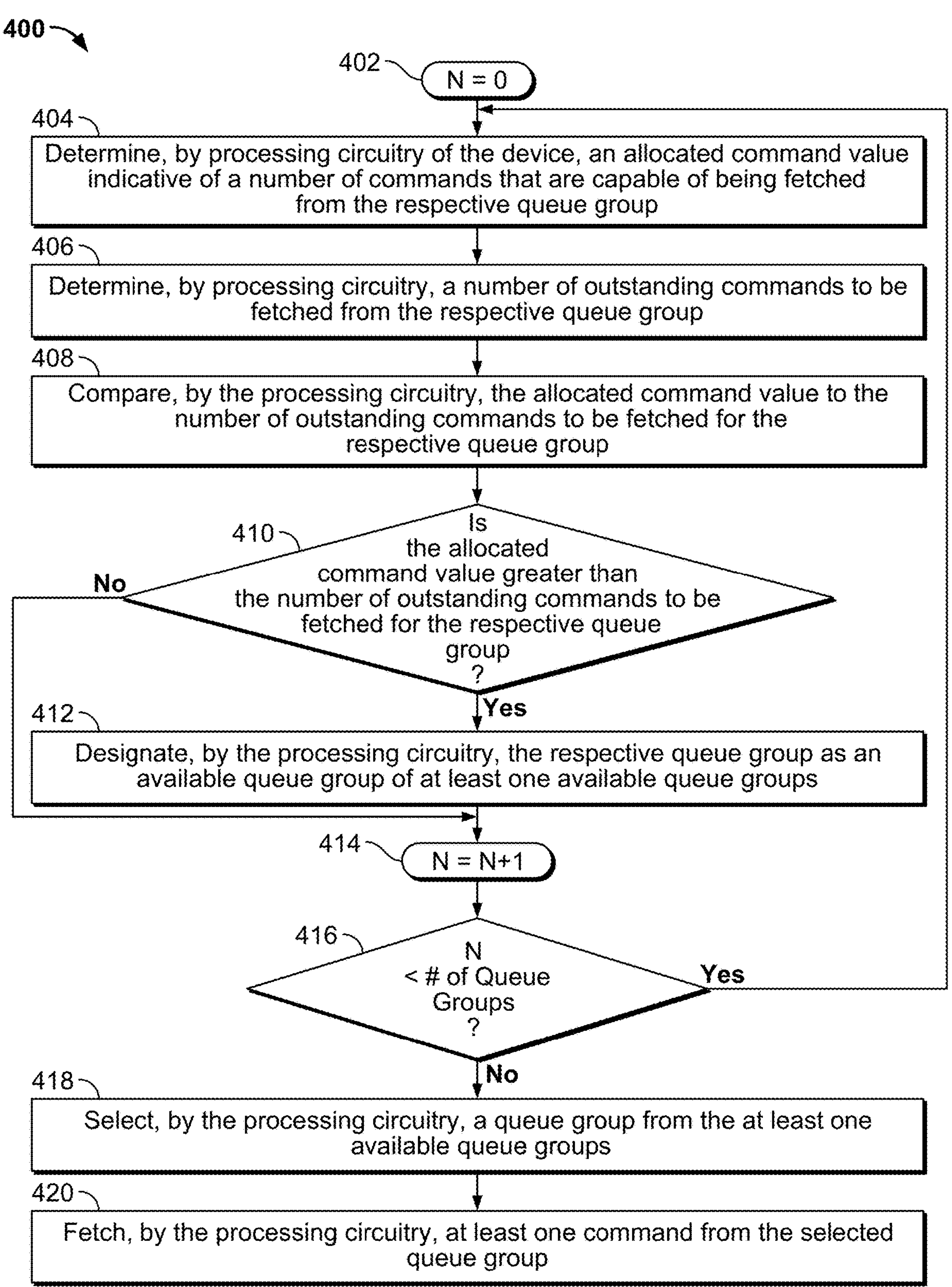
FIG. 4 shows a flowchart of illustrative steps of a process for managing command fetches for a device, in accordance with some embodiments of the present disclosure.

FIG. 4 shows a flowchart of illustrative steps of a process 400 for managing command fetches for a device, in accordance with some embodiments of the present disclosure. In some embodiments, the referenced system, device, processing circuitry, persistent storage media, host, system memory, queue groups, and queue sets may be implemented/represented as system 100, device 102, processing circuitry 104, persistent storage media 105, host 106, system memory 108, queue groups (e.g., 110, 112), and queue sets (e.g., 114, 116, 118, 120, 122, 124, 126). In some embodiments, process 400 can be modified by, for example, having steps rearranged, changed, added, and/or removed.

At step 402, process 400 initializes counter N to 0, as following steps 404-416 form a loop to evaluate each queue group allocated in the system memory of the device. This step 402, along with steps 414 and 416 are illustrated to indicate that counter N may be updated or compared to other values in order to proceed to other steps. Although FIG. 4 shows counter N used for process 400, a counter N is not necessarily implemented in device for processing circuitry to evaluate each of the queue groups allocated in system memory. Once counter N is initialized, process 400 proceeds to step 404.

At step 404, the processing circuitry determines an allocated command value indicative of a number of commands that are capable of being fetched from the respective queue group (e.g., queue group N). In some embodiments, the allocated command value of a queue group is determined based on an amount of processing resources allocated for fetching commands from the queue group. The allocated command value for each queue group may be preset before the device receives commands from a host. In some embodiments, the allocated command value may be represented by a number of commands of a particular size in the queue group from which the processing circuitry may fetch commands. In some embodiments, the allocated command value may be indicative of the amount of bandwidth that the processing circuitry is allocated to fetch commands from a queue group. The allocated command value for a respective queue group is a share of a total command allocation capacity, which is defined as a sum of each allocated command value for each queue group in system memory. In some embodiments, each respective queue group is allocated with the same allocated command value. In some embodiments, one or more queue groups may have a greater allocated command value than other queue groups in the same system memory. In some embodiments, the allocated command value for a respective queue group (e.g., queue group N) may be updated while the device is in operation, where the allocated command value is updated based on the volume of commands received and stored in the respective queue group or the frequency of receiving commands stored in the respective queue group. In some embodiments, the processing circuitry allocates a shared allocated command value in order for the processing circuitry to fetch additional commands from any one or more respective queue group, in addition to the allocated command value for each of the one or more respective queue group. Once the processing circuitry determines the allocated command value indicative of a number of commands that are capable of being fetched from the respective queue group, the processing circuitry then determines a number of outstanding commands to be fetched from the respective queue group, at step 406.

At step 406, the processing circuitry determines a number of outstanding commands to be fetched from the respective queue group (e.g., queue group N). In some embodiments, the number of outstanding commands to be fetched from a respective queue group is determined based on information of at least one command fetch request sent from the processing circuitry to the respective queue group. The number of outstanding commands to be fetched may be determined by determining the number of commands stored in queue sets of the respective queue group which have yet to be fetched but have been included in a command fetch request sent from the processing circuitry. In some embodiments, the number of outstanding commands to be fetched may be represented by a number of commands of a particular size in the queue group. In some embodiments, the number of outstanding commands to be fetched may be indicative of the amount of bandwidth required to fetch the outstanding commands from the queue group by the processing circuitry based on the data size of the outstanding commands to be fetched. As processing circuitry generates and sends command fetch requests to the system memory to fetch commands from a respective queue group, the associated number of outstanding commands to be fetched from the respective queue group increases. In some embodiments, the increase in the outstanding number of commands to be fetched may be based on one or more of the number of commands included in the command fetch requests, the number of commands stored in the respective queue group, and the size of the commands stored in the respective queue group. Once an outstanding command is fetched from a queue set of a respective queue group, the associated number of outstanding commands to be fetched from the respective queue group decreases. In some embodiments, this decrease in the outstanding number of commands to be fetched may be based on one or more of the number of commands fetched by the processing circuitry and the size of each command fetched. Once the processing circuitry determines the number of outstanding commands to be fetched from queue group N, processing circuitry then compares the allocated command value to the number of outstanding commands to be fetched for the respective queue group (e.g., queue group N), at step 408.

At step 408, the processing circuitry compares the allocated command value to the number of outstanding commands to be fetched for the respective queue group (e.g., queue group N). In some embodiments, when comparing the allocated command value of a respective queue group to the number of outstanding commands to be fetched for the respective queue group, the processing circuitry may include at least a portion of the shared allocated command value to the allocated command value of the respective queue group. The processing circuitry then proceeds to step 410, to determine the next step of process 400 based on the comparison performed at step 408.

At step 410, the processing circuitry determines whether the allocated command value is greater than the number of outstanding commands to be fetched for the respective queue group (e.g., queue group N), based on the comparison made at step 410. When the allocated command value is greater than the number of outstanding commands to be fetched for the respective queue group, process 400 proceeds to step 412 for the processing circuitry to designate the respective queue group as an available queue group. When the allocated command value is less than or equal to the number of outstanding commands to be fetched for the respective queue group, process 400 proceeds to step 414 to increment counter N.

At step 412, the processing circuitry designates the respective queue group (e.g., queue group N) as an available queue group of at least one available queue groups from which at least one command may be fetched. In some embodiments, the respective queue group is designated as an available queue group from which at least one command may be fetched by using a lookup table or any suitable bit mapping to indicate which queue group is available for processing circuitry to send command fetch requests. Once the processing circuitry designates the respective queue group as an available queue group, process 400 then proceeds to step 414 to increment counter N.

At step 414, counter N is incremented by one value. Counter N is incremented in order for processing circuitry to evaluate another queue group of the system memory. Once counter N is incremented, process 400 then proceeds to step 416 to determine whether there are further queue groups to be evaluated.

At step 416, counter N is compared to the number of queue groups allocated in system memory. This comparison is indicative of whether there is at least one queue group which has yet to be evaluated by steps 404-412. When counter N is less than the number of queue groups, process 400 proceeds to step 404 in order to evaluate another respective queue group (e.g., queue group N+1). When counter N is greater than or equal to the number of queue groups, each of the queue groups in system memory have been evaluated and process 400 proceeds to step 418 to select a queue group from the available queue groups which had been designated at each iteration of step 412.

At step 418, the processing circuitry selects a queue group from the available queue groups. In some embodiments, the selection is performed randomly, or in a round-robin manner. In some embodiments, the selection may be based on, in part, a respective priority of each available queue group. In some embodiments, the processing circuitry selects a queue group from the available queue groups based on an associated priority of each available queue group. Once the processing circuitry selects a queue group, processing circuitry is then to fetch at least one command from the selected queue group, at step 420.

At step 420, the processing circuitry fetches at least one command from the selected queue group. The processing circuitry sends at least one command fetch request to the system memory to fetch at least one command from the selected queue group. In some embodiments, the processing circuitry fetches at least one command from at least one of the queue sets of the selected queue group. In some embodiments, the queue sets of the selected queue group from which commands are fetched are determined based on any one or more of associated queue set priorities, the number of commands stored in each queue set, or the amount of data stored in each queue set. The processing circuitry fetches commands which are stored in the submission queue of queue sets within the selected queue group. Once a command is fetched from the submission queue, the system memory generates a command fetch response which includes at least one fetched command. The command fetch response may be stored in the corresponding completion queue of the queue set from which the command was fetched. The command fetch response is than sent to the processing circuitry to execute the at least one fetched command.

Figure 5:
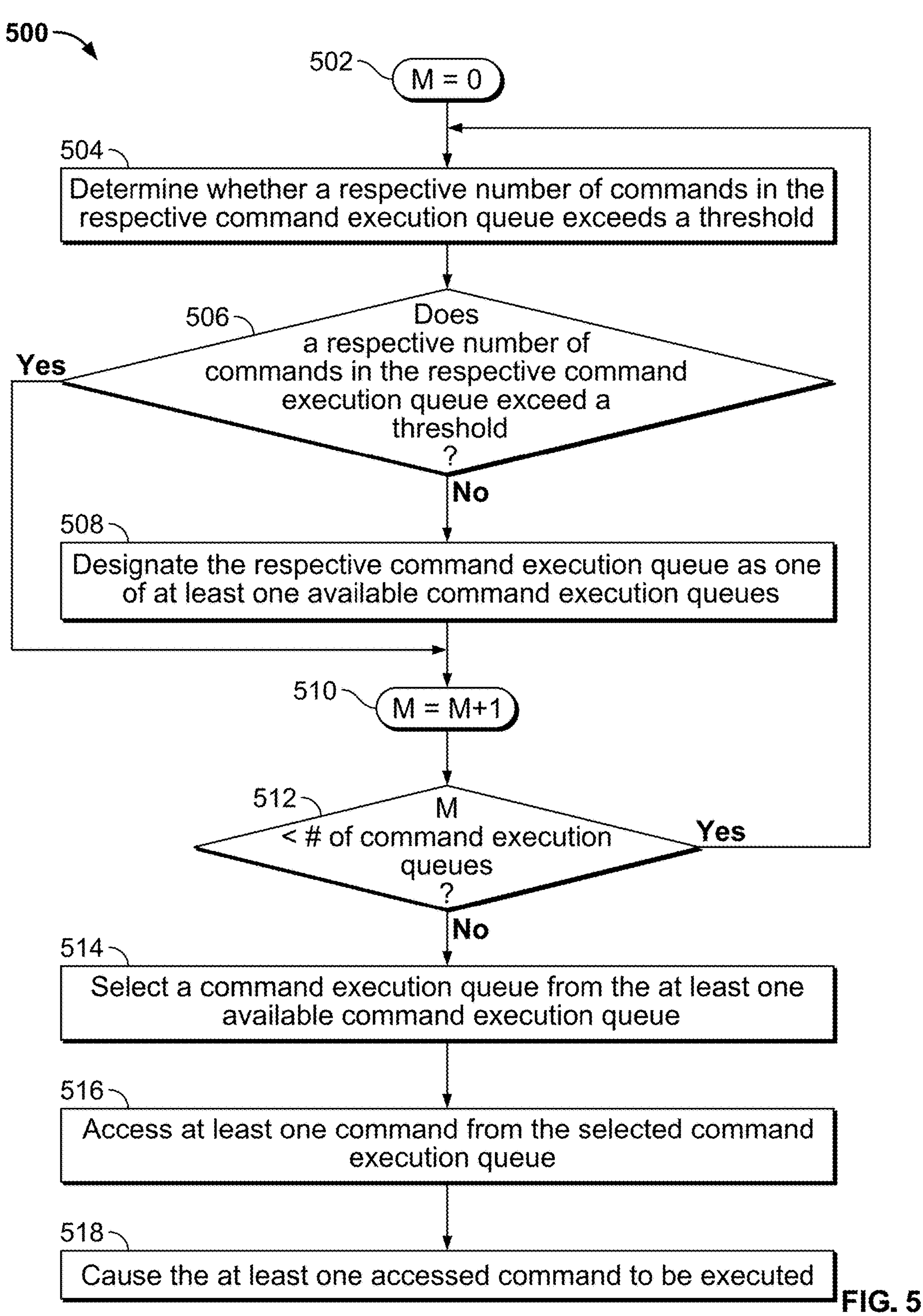
FIG. 5 shows a flowchart of illustrative steps of a process for managing command execution on a device, in accordance with some embodiments of the present disclosure.

FIG. 5 shows a flowchart of illustrative steps of a process 500 for managing command execution on a device, in accordance with some embodiments of the present disclosure. In some embodiments, the referenced system, device, processing circuitry, persistent storage media, host, system memory, queue groups, queue sets, and command execution queues may be implemented or represented as system 100, device 102, processing circuitry 104, persistent storage media 105, host 106, system memory 108, queue groups (e.g., 110, 112), queue sets (e.g., 114, 116, 118, 120, 122, 124, 126), and command execution queues (e.g., 204, 206). In some embodiments, process 500 can be modified by, for example, having steps rearranged, changed, added, and/or removed.

At step 502, process 500 initializes counter M to 0, as following steps 504-512 form a loop to evaluate each command execution queue allocated in the device. Step 502, along with steps 510 and 512 are illustrated to indicate that counter M may be updated or compared to other values in order to proceed to other steps. Although FIG. 5 shows counter M used for process 500, a counter M is not necessarily implemented in device for processing circuitry to evaluate each of the command execution queue allocated for the device. In some embodiments, each respective queue group allocated in system memory is associated with a corresponding command execution queue at which commands fetched from the respective queue group are temporarily stored until execution by processing circuitry. Once counter M is initialized, process 500 proceeds to step 504.

At step 504, the processing circuitry determines whether a respective number of commands in the respective command execution queue (e.g., command execution queue M) exceeds a threshold. In some embodiments the threshold value may be configured based on a constant threshold value for each command execution queue. In some embodiments, each command execution queue has a respective threshold, where each respective threshold is not necessarily the same value. In some embodiments, the threshold of a respective command execution queue is determined based on an amount of processing resources allocated for executing commands from the queue group associated with the respective command execution queue. The threshold for each command execution queue may be preset before the device receives commands from a host. In some embodiments, the threshold may be represented by a number of commands of a particular size in the command execution queue from which the processing circuitry may access a command for execution. In some embodiments, the threshold may be indicative of the amount of data stored in a respective command execution queue at which the processing circuitry should pause accessing commands for execution. The threshold for a respective command execution queue may be determined by a share of a total processing resources for executing commands, which is defined by the processing capabilities of a processor or a memory controller (e.g., DMA controller) of the processing circuitry. In some embodiments, each respective command execution queue is allocated with the same amount of processing resources, and therefore the same threshold is implemented within each command execution queue. In some embodiments, one or more command execution queue may have a greater threshold than other command execution queues. The processing circuitry compares the number of commands stored in the respective command execution queue to determine whether a respective number of commands in the respective command execution queue exceeds the respective threshold of the respective command execution queue. As processing circuitry accesses commands from a respective command execution queue, the number of commands stored in the respective command execution queue decreases by the number of commands accessed. As more commands are fetched, by processing circuitry, from a queue group that corresponds to the respective command execution queue, the number of commands stored in the respective command execution queue increase by the number of commands fetched. Once the processing circuitry determines whether the respective number of commands in the respective command execution queue (e.g., command execution queue M), process 500 then proceeds to step 506 to determine the next step of process 500 based on the determination performed at step 504.

At step 506, the processing circuitry determines whether the respective number of commands in the respective command execution queue (e.g., command execution queue M) exceeds the threshold based on the determination made at step 504. When the respective number of commands in the respective command execution queue does not exceed the threshold, process 500 proceeds to step 508 for the processing circuitry to designate the respective command execution queue (e.g., command execution queue M) as an available command execution queue. When the respective number of commands in the respective command execution queue exceeds the threshold, process 500 proceeds to step 510 to increment counter M.

At step 508, the processing circuitry designates the respective command execution queue (e.g., command execution queue M) as an available command execution queue of at least one available command execution queues from which at least one command may be accessed for execution. In some embodiments, the respective command execution queue is designated as an available command execution queue from which at least one command may be accessed by using a lookup table or any suitable bit mapping to indicate which command execution queue is available for processing circuitry to access commands for execution. Once the processing circuitry designates the respective command execution queue as an available command execution queue, process 500 then proceeds to step 510 to increment counter M.

At step 510, counter M is incremented by one value. Counter M is incremented in order for processing circuitry to evaluate another command execution queue of the device. Once counter M is incremented, process 500 then proceeds to step 512 to determine whether there are further command execution queues to be evaluated.

At step 512, counter M is compared to the number of command execution queues allocated in the device. This comparison is indicative of whether there is at least one command execution queue which has yet to be evaluated by steps 504-508. When counter M is less than the number of command execution queues, process 500 proceeds to step 504 in order to evaluate another respective command execution queue (e.g., command execution queue M+1). When counter M is greater than or equal to the number of command execution queues, process 500 proceeds to step 514 to select a command execution queue from the available command execution queues designated at step 508.

At step 514, the processing circuitry selects a command execution queue from the available command execution queues. In some embodiments, the selection is random, or based on a round-robin method. In some embodiments, the selection may be based on, in part, a respective priority of each available command execution queue. In some embodiments, the selection is performed randomly, or in a round-robin manner. In some embodiments, the selection may be based on, in part, a respective priority of each available command execution queue. In some embodiments, the processing circuitry selects a command execution queue from the available command execution queues based on an associated priority of each available command execution queue. The processing circuitry is then to access at least one command from the selected command execution queue, at step 516.

At step 516, the processing circuitry accesses at least one command from the selected command execution queue. The processing circuitry accesses at least one command from the selected command execution queue. As processing circuitry accesses commands from a respective command execution queue, the number of commands stored in the respective command execution queue decreases by the number of commands accessed. Once the processing circuitry accesses the at commands from the selected command execution queue, processing circuitry then causes the accessed commands to be executed, at step 518.

At step 518, the processing circuitry causes the commands accessed at step 516 to be executed by processing circuitry. In some embodiments, the processing circuitry includes a multi-core processor, which executes accessed commands in parallel. In some embodiments, at least one accessed command is a DMA command, which is executed by a DMA controller or any other suitable, standalone processor to execute the DMA command.

Figure 6:
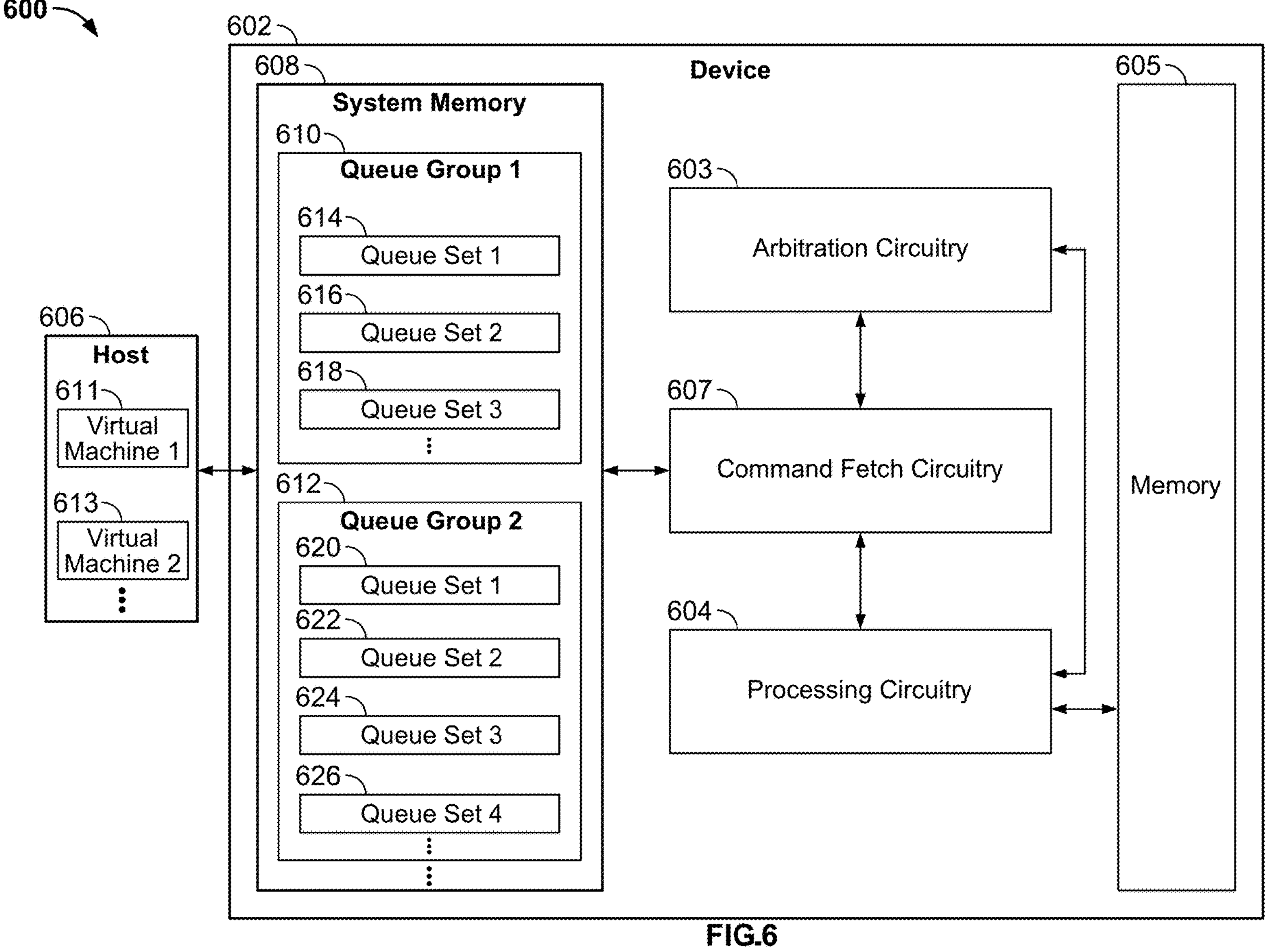
FIG. 6 shows a diagram of a system that includes a host and a device with command fetch circuitry, arbitration circuitry, and processing circuitry, in accordance with some embodiments of the present disclosure.

FIG. 6 shows a diagram of a system 600 that includes a host 606 and a device 602 with command fetch circuitry 607, arbitration circuitry 603, and processing circuitry 604, in accordance with some embodiments of the present disclosure. In some embodiments, device 602 may be a storage device such as a solid-state storage device (e.g., an SSD device). In some embodiments, each of command fetch circuitry 607, arbitration circuitry 603, and processing circuitry 604 may include a processor or any suitable processing unit. In some embodiments, memory 605 may include non-volatile memory. It will be understood that the embodiments of the present disclosure are not limited to SSDs. For example, in some embodiments, device 602 may include a hard disk drive (HDD) device in addition to or in place of an SSD. In some embodiments, system memory 608 may be implemented as temporary memory (e.g., cache or any suitable volatile memory) including queue groups (e.g., first queue group 610 and second queue group 612) which include at least one queue set (e.g., 614, 616, 618, 620, 624, 626) to store commands received from host 606.

Device 602 is configured to fetch commands from host 606 and store the commands in system memory 608. System memory 608 is divided into queue groups (e.g., first queue group 610 and second queue group 612), each of which includes at least one queue set (e.g., 614, 616, 618, 620, 624, 626). In some embodiments, each queue set (e.g., 614, 616, 618, 620, 624, 626) includes a submission queue at which to receive and store the received commands from host 606, and a completion queue to store command fetch responses. In some embodiments, a respective command received from host 606 may be stored in a queue group (e.g., first queue group 610 and second queue group 612) based on the virtual machine of host 606 from which the command originates. Host 606 includes at least two virtual machines (e.g., first virtual machine 11 and second virtual machine 613), and the system memory 608 maps a corresponding queue group to the each of the virtual machines (e.g., first virtual machine 610 and second virtual machine 613). For example, first queue group 610 and its respective queue sets (e.g., 614, 616, and 618) may be mapped to the first virtual machine 611 of host 606 and store commands which are associated with the first virtual machine 611 and second queue group 612 and its respective queue sets (e.g., 620, 622, 624, and 626) may be mapped to the second virtual machine 613 of host 606 and store commands which are associated with the second virtual machine 613.

The number of queue groups (e.g., first queue group 610 and second queue group 612) and their respective queue sets (e.g., 614, 616, 618, 620, 624, 626) may be allocated according to any one or more of (a) characteristics of the commands (e.g., type of command and size of command), (b) workload priority associated with the commands, (c) frequency at which commands are received for each virtual machine, (d) number of virtual machines of host 606, and (e) available memory of system memory 608. For example, the first queue group 610 may be configured to store commands from the first virtual machine 611 and the second queue group 612 may be configured to store commands from the second virtual machine 613. In such an example, the available memory of system memory 608 may be allocated such that the second queue group 612 includes more queue sets than the first queue group 610. In some embodiments, each queue set (e.g., 614, 616, 618, 620, 624, 626) may be of the same allocated memory size. In some embodiments, each queue set (e.g., 614, 616, 618, 620, 624, 626) may be of variable allocated memory size, i.e., some selected queue sets may be of a larger allocated memory size than other queue sets. Although the aforementioned examples described herein and FIG. 6 illustrates system memory 608 with two queue groups (e.g., first queue group 610 and second queue group 612), system memory 608 may include more than two queue groups. Furthermore, although FIG. 6 illustrates each queue group (e.g., first queue group 610 and second queue group 612) with three or four queue sets (e.g., 614, 616, 618, 620, 624, 626), each queue group may include one or more queue sets based on the size of queue sets and the available memory that may be allocated in system memory 608. In some embodiments, each queue set (e.g., 614, 616, 618, 620, 624, 626) may be implemented as any first-in first-out data structure (e.g., queue).

In some embodiments, system memory 608 is volatile memory, which may include any one or more volatile memory, such as static random access memory (SRAM). In some embodiments, volatile memory is configured to temporarily store data (e.g., commands received from host 606 and command fetch responses) while command fetch circuitry 607 fetches commands, arbitration circuitry 603 selects a queue group from which to fetch a command, and processing circuitry 604 processes commands. In some embodiments, command fetch circuitry 607 is communicatively coupled to volatile memory to store and access commands received from host 606. In some embodiments, a data bus interface is used to transport commands or command data from volatile memory to command fetch circuitry 607. In some embodiments, command fetch circuitry 607 is communicatively coupled to processing circuitry 604 to transport fetched commands to the processing circuitry 604 to be processed.

Although FIG. 6 shows each queue group (e.g., first queue group 610 and second queue group 612) in system memory 608, in some embodiments each queue group (e.g., 610 and 612) and each queue set (e.g., 614, 616, 618, 620, 622, 624, and 626), and the associated data (e.g., commands and command fetch responses) of the queue sets are stored in host 606. In some embodiments, host 606 includes host memory to store each queue group (e.g., 610 and 612), their respective queue sets (e.g., 614, 616, 618, 620, 622, 624, and 626) and the associated data (e.g., commands and command fetch responses). In such embodiments, command fetch circuitry 607 may fetch commands stored in host memory of host 606 in a similar manner to as to fetch commands stored in system memory 608 of the device 602 discussed herein.

Each respective virtual machine (e.g., first virtual machine 611 and second virtual machine 613) of host 606 includes at least one application which is mapped to the queue group associated with the respective virtual machine (e.g., first virtual machine 611 and second virtual machine 613). In some embodiments, each respective virtual machine (e.g., first virtual machine 611 and second virtual machine 613) uses a virtualization scheme such as Multi-Function NVMe Device (MFND), Single Root-I/O Virtualization (SR-IOV) and Scalable I/O Virtualization (SIOV). Although FIG. 6 illustrates host 606 with first virtual machine 611 and second virtual machine 613, host 606 may include more than two virtual machines. In addition, device 602 may be communicatively coupled to more than one host (e.g., host 606), each of which includes virtual machines (e.g., first virtual machine 611 and second virtual machine 613).

The arbitration circuitry 603 of device 602 is configured to determine a first credits value indicative of a number of commands capable of being fetched from a queue group (e.g. first queue group 610 and second queue group 612) associated with the respective virtual machine (e.g., first virtual machine 611 and second virtual machine 613). In some embodiments, the first credits value for a respective virtual machine (e.g., first virtual machine 611 and second virtual machine 613) determined by arbitration circuitry 603 as a number of commands (e.g., Input/Outputs (I/Os)) which may be fetched from the queue group (e.g., 610 and 612) of the associated virtual machine (e.g., 611 and 613). In some embodiments, the first credits value of a virtual machine is determined based on an amount of processing resources allocated for fetching a number of commands from the queue group (e.g., 610 and 612) associated with the virtual machine (e.g., 611 and 613). The first credits value may be initialized at an initial state and an initial first credits value, which may be preset prior to operation of device 602. The first credits value of a respective virtual machine (e.g., 611 and 613) may be updated over time, such that the first credits value decreases as commands are fetched from the queue group (e.g., 610 and 612) associated with the respective virtual machine (e.g., 611 and 613). In addition, the first credits value may be increased due to a refill of first credits value. In some embodiments refills occur once after a repeated refill timer has completed one cycle. This ensures that device 602 is allocated with the processing resources to fetch commands from each respective virtual machine (e.g., 611 and 613) of host 606. In some embodiments, the first credits value is also updated by the completion of a cycle of a carryover timer, which is used to reset the first credits value to a respective initial first credits value to ensure a steady state exchange of processing resources to fetch commands from the virtual machine (e.g., 611 and 613) of host 606. Once the arbitration circuitry 603 determines the first credits value of the respective virtual machine (e.g., 611 and 613) of host 606, the arbitration circuitry 603 then determines a second credits value of the respective virtual machine (e.g., 611 and 613).

The arbitration circuitry 603 of device 602 is configured to determine a second credits value indicative of a bandwidth for fetching at least one command from the queue group (e.g., 610 and 612) associated with the respective virtual machine (e.g., 611 and 613). In some embodiments, the second credits value for a respective virtual machine (e.g., 611 and 613) determined by arbitration circuitry 603 as an amount of processing bandwidth allocated to fetch commands (e.g., amount of data associated with fetched commands) from the queue group (e.g., 610 and 612) of the associated virtual machine (e.g., 611 and 613). In some embodiments, the second credits value of a virtual machine (e.g., 611 and 613) is determined based on an amount of processing bandwidth resources allocated for fetching an amount of data associated with commands of the queue group (e.g., 610 and 612) associated with the virtual machine (e.g., 611 and 613). The second credits value may be initialized at an initial state and an initial second credits value, which may be preset prior to operation of device 602. The second credits value of a respective virtual machine (e.g., 611 and 613) may be updated over time, such that the second credits value decreases as commands are fetched from the queue group (e.g., 610 and 612) associated with the respective virtual machine (e.g., 611 and 613). In addition, the second credits value may increase due to a refill of the second credits value. In some embodiments refills occur once after a repeated refill timer has completed one cycle. This ensures that device 602 is allocated with the processing bandwidth resources to fetch commands of a certain data size from each respective virtual machine (e.g., 611 and 613) of host 606. In some embodiments, the second credits value is also updated by the completion of a cycle of a carryover timer, which is used to reset the second credits value to a respective initial second credits value to ensure a steady state exchange of processing bandwidth resources to fetch commands from the virtual machine (e.g., 611 and 613) of host 616.

Once arbitration circuitry 603 evaluates each virtual machine (e.g., 611 and 613) of host 606, arbitration circuitry 603 selects a virtual machine (e.g., 611 and 613) based on at least one of the first credits value and the second credits value for each of the virtual machines (e.g., 611 and 613) of host 616. In some embodiments, arbitration circuitry 603 determines a state for each of the first credits value and the second credits value of the virtual machine (e.g., 611 and 613). The state of the first credits value is based on the first credits value and at least a first predetermined value. The state of the second credits value is based on the second credits value and at least a second predetermine value. In some embodiments, each predetermined value for the first credits value and second credits value may be preset prior to operation of device 602 and command fetch arbitration. In some embodiments, each predetermined value is configured based on a priority to fetch commands from a queue group (e.g., first queue group 610 and second queue group 612) associated with a virtual machine (e.g., 611 and 613) at a respective amount of processing resources to fetch commands or a respective amount of processing bandwidth resources to fetch commands. For example, when the state of each of the first credits value is based on one predetermined value (e.g., first predetermined value for first credits value and second predetermined value for second credits value), there are two possible states (e.g., a first state and a second state) that may be determined for each of the first credits value and a second credits value. In such an example, the first state is of a higher priority than the second state, such that the arbitration circuitry 603 selects a first virtual machine (e.g., first virtual machine 611) of a first state over a second virtual machine (e.g., second virtual machine 613) of a second state from which to fetch commands, wherein each of the first state and second state refers to either a state of first credits value or a state of second credits value. The arbitration circuitry 603 is configured to select the virtual machine (e.g., 611 and 613) based on at least one of a highest state of first credits value and a highest state of second credits value. In some embodiments, when two or more respective virtual machines of the virtual machines (e.g., 611 and 613) of host 606 are of the same first credits value state and second credits value state, the arbitration circuitry 603 randomly selects among the two or more respective virtual machines (e.g., 611 and 613). In some embodiments, when two or more respective virtual machines of the virtual machines (e.g., 611 and 613) of host 606 are of the same first credits value state and second credits value state, the arbitration circuitry 603 selects among the two or more respective virtual machines using a weighted priority selection. Therefore, when first virtual machine (e.g., first virtual machine 611) of a high priority and a second virtual machine (e.g., second virtual machine 613) of low priority are of the same first credits value state and second credits value state, the arbitration circuitry 603 selects the first virtual machine (e.g., first virtual machine 611) and associated queue group (e.g., first queue group 610) from which to fetch commands. In some embodiments, the arbitration circuitry 603 selects a virtual machine (e.g., 611 and 613) based on the first credits value for each of the at least two virtual machines of host 606. In some embodiments, the arbitration circuitry 603 selects a virtual machine (e.g., 611 and 613) based on the second credits value for each of the at least two virtual machines (e.g., 611 and 613) of host 606. Once the arbitration circuitry 603 selects a virtual machine (e.g., 611 and 613) based on at least one of the first credits value and the second credits value for each of the at least two virtual machines (e.g., 611 and 613), the arbitration circuitry 603 communicates a signal to the command fetch circuitry 607 to fetch at least one command from the queue group (e.g., 610 and 612) associated with the selected virtual machine.

The arbitration circuitry 603 is further configured to communicate a signal to the command fetch circuitry 607 of device 602 to fetch at least one command from a queue group (e.g., 610 and 612) associated with the selected virtual machine (e.g., 611 and 613). In some embodiments, the signal includes data indicative of the selected virtual machine from which to fetch at least one command. Once the arbitration circuitry 603 communicates the signal to the command fetch circuitry 607 to fetch at least one command from the queue group (e.g., first queue group 610 and second queue group 612) associated with the selected virtual machine, the command fetch circuitry 607 receives the signal from the arbitration circuitry 603.

The command fetch circuitry 607 is configured to receive the signal from the arbitration circuitry 603 and once the command fetch circuitry 607 receives the signal from the arbitration circuitry 603, the command fetch circuitry 607 determines whether the signal was received from the arbitration circuitry 603. When command fetch circuitry 603 does not receive the signal from the arbitration circuitry 603, i.e., the signal is lost or corrupted during the transit from the arbitration circuitry 603, the arbitration circuitry 603 then communicates the signal to the command fetch circuitry 607 of device 602 to fetch at least one command from the queue group (e.g., 610 and 612) associated with the selected virtual machine. When the command fetch circuitry 607 does receive the signal from the arbitration circuitry 603, the command fetch circuitry 607 fetches at least one command from the queue group (e.g., 610 and 612) associated with the selected virtual machine. The command fetch circuitry 607 fetches at least one command from the queue group (e.g., 610 and 612) associated with the selected virtual machine. In some embodiments, the command fetch circuitry 607 sends at least one command fetch request to system memory 608 to fetch at least one command from the queue group (e.g., 610 and 612) associated with the selected virtual machine. In some embodiments, the command fetch circuitry 607 sends at least one command fetch request to host 606 to fetch at least one command from the queue group associated with the selected virtual machine stored on host 606. The command fetch request may include data indicative of the virtual machine (e.g., 611 and 613) from which to fetch commands and a number of commands to be fetched from the associated queue group (e.g., 610 and 612). The commands fetched from the queue group (e.g., 610 and 612) associated with the selected virtual machine may be from at least one of the queue sets (e.g., 614, 616, 618, 620, 622, 624, and 626) of the queue group (e.g., 610 and 612). In some embodiments, commands are fetched from queue sets (e.g., 614, 616, 618, 620, 622, 624, and 626) of the queue group (e.g., 610 and 612) associated with the selected virtual machine based on a respective priority of each queue set (e.g., 614, 616, 618, 620, 622, 624, and 626). Therefore, a first subset of commands fetched from a first queue set of the queue group may be of a high priority, and a second subset of commands subsequently fetched from a second queue set of the queue group may be of a lower priority. In some embodiments, the queue set of the queue group associated with the selected virtual machine from which commands are fetched is selected at random. In some embodiments, the command fetch circuitry 607 fetches commands until any one of the following conditions are met: (a) each command stored in the queue group associated with the selected virtual machine has been fetched, (b) the first credits value of the selected virtual machine has decreased below a halting first credits value, (c) the second credits value of the selected virtual machine has decreased below a halting second credits value, and (d) the command fetch circuitry 607 receives a reset signal. The command fetch circuitry 607 fetches commands which are stored in the submission queue of the queue sets (e.g., 614, 616, 618, 620, 622, 624, and 626) within the queue group (e.g., 610 and 612) associated with the selected virtual machine. Once a command is fetched from the submission queue, the system memory 608 generates a command fetch response which includes at least one fetched command and relevant information regarding the at least one fetched command (e.g., command type and data size). In some embodiments, when the command fetch circuitry 607 fetches commands from queue groups (e.g., 610 and 612) stored on host 606, host 606 generates the command fetch response which includes at least one fetched command. The command fetch response may be stored in the corresponding completion queue of the queue set (e.g., 614, 616, 618, 620, 622, 624, and 626) from which the command was fetched. When the command fetch circuitry 607 fetches a command from the queue group (e.g., 610 and 612) associated with a respective virtual machine, the command fetch circuitry 607 may communicate a signal to the arbitration circuitry 603 to decrement the first credits value of the respective virtual machine to reflect a use of the processing resource to fetch commands from the respective virtual machine (e.g., 611 and 613). In some embodiments, the command fetch circuitry 607 may determine the data size of the fetched command based on the command fetch response. In such embodiments, the command fetch circuitry 607 may communicate a signal to the arbitration circuitry 603 to decrement the second credits value of the respective virtual machine to reflect the amount of bandwidth required to fetch the command of the command fetch response from the respective virtual machine (e.g., 611 and 613). The command fetch response is then sent to the command fetch circuitry 607 to be communicated to the processing circuitry 604 for execution. The command fetch circuitry 607 then communicates the at least one fetched command to processing circuitry 604 for execution. In some embodiments, the processing circuitry 604 communicates a signal to the arbitration circuitry 603 to decrement the second credits value of the respective virtual machine to reflect the amount of bandwidth required to fetch the command of the command fetch response from the respective virtual machine.

For purposes of brevity and clarity, the features of the disclosure described herein are in the context of a device 602 (e.g., an SSD device) having command arbitration circuitry 603, command fetch circuitry 607, processing circuitry 604 and system memory 608. However, the principles of the present disclosure may be applied to any other suitable context in which a device fetches and executes commands from a virtual machine of a host. The device 602 may include processing circuitry 604, arbitration circuitry 603, and system memory 608, which are each communicatively coupled to command fetch circuitry 607 by network buses or interfaces. In some embodiments, arbitration circuitry 603 and processing circuitry are also communicatively coupled to update the second credits value for a respective virtual machine. In some embodiments, the device receives commands from a host 606 through a port. In some embodiments, the device may receive commands from multiple hosts with virtual machines. In some embodiments, the commands are sent from a virtual machine (e.g., first virtual machine 611 and second virtual machine 613) of any of the hosts (e.g., host 606) to the device via a network bus or interface.

Device 602 receives commands from host 606 through a port, where the host 606 and the port are communicatively coupled by the network bus. The network bus may transport commands and data between host 606 and device 602. The network bus may transport commands and data using a Non-Volatile Memory Express (NVMe), Peripheral Component Interconnect Express (PCIe), or any other suitable network protocol.

Additionally, device 602 includes memory 605. Memory 605 may also be hereinafter referred to as main memory of device 602. In some embodiments, memory 605 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, memory 605 includes memory of a memory density, the memory density is any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. Processing circuitry 604 is communicatively coupled to memory 605 to store and access data in memory blocks or pages of memory 605. In some embodiments, a data bus interface is used to transport data transfer requests or data. In some embodiments, the data bus interface includes a data transfer request bus and a data interface. In some embodiments, memory 605 includes multiple memory die. In some embodiments, memory 605 includes multiple bands of memory, each band spanning across each memory die. In some embodiments, memory 605 may be accessed (e.g., read or written to) using direct memory access (DMA) by the processing circuitry 604. In such embodiments, the processing circuitry 604 includes a processor to fetch and execute commands, and a memory controller (e.g., a DMA controller) to process and perform DMA transfers independent of the execution of instructions by the processor.

In some embodiments, each processor or processing unit of command fetch circuitry 607, arbitration circuitry 603, and processing circuitry 604 may include a hardware processor, a software processor (e.g., a processor emulated using a virtual machine), or any combination thereof. The processor of processing circuitry 604 may include any suitable software, hardware, or both for communicating with command fetch circuitry 607 and arbitration circuitry 603, and controlling memory 605 and processing circuitry 604 while executing commands. In some embodiments, device 602 may further include a multi-core processor. In some embodiments, processing circuitry 604 includes a memory controller (e.g., direct memory access (DMA) controller), which may include any suitable software, hardware, or both for accessing memory 605 independent of the processor which executes commands. Memory 605 may also include hardware elements for non-transitory storage of instructions, commands, or requests.

In some embodiments, device 602 may be a storage device (for example, SSD device) which may include one or more packages of memory dies (e.g., memory 605), where each die includes storage cells. In some embodiments, the storage cells are organized into pages or super pages, such that pages and super pages are organized into blocks. In some embodiments, each storage cell can store one or more bits of information.

For purposes of clarity and brevity, and not by way of limitation, the present disclosure is provided in the context of managing the fetching arbitration of commands from virtual machines of a host. The process of managing the fetching arbitration of commands from virtual machines of a host may be configured by any suitable software, hardware, or both for implementing such features and functionalities. Managing the fetching arbitration of commands from virtual machines of a host may be at least partially implemented in, for example, device 602 (e.g., as part of arbitration circuitry 603, processing circuitry 604, command fetch circuitry 607, or any other suitable device). For example, for a solid-state storage device (e.g., device 602), managing the fetching arbitration of commands from virtual machines of a host may be implemented in arbitration circuitry 603, command fetch circuitry 607, and processing circuitry 604. Managing the fetching arbitration of commands from virtual machines (e.g., 611 and 613) of a host (e.g., host 606) may improve hardware resources requirements (e.g., gate count reduction) and command bandwidth fairness between virtual machines of the host. The improved hardware resource requirements and improved command bandwidth fairness between virtual machines results in an improved performance speed of device 602 to fetch and execute commands.

Figure 7:
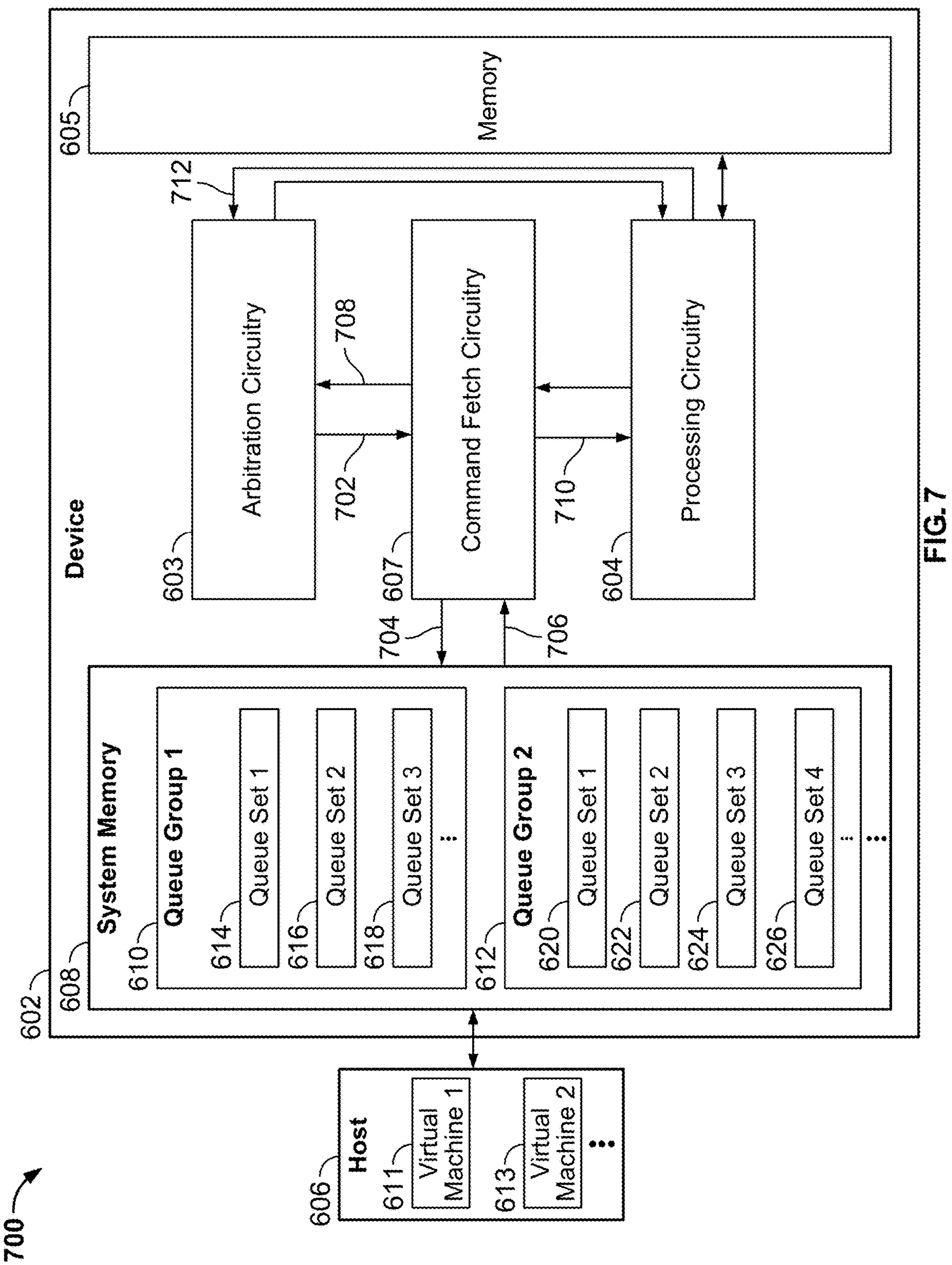
FIG. 7 shows a diagram of an implementation of the device of FIG. 6 for managing example commands received from the host, in accordance with some embodiments of the present disclosure.

FIG. 7 shows a diagram of an implementation of the device of FIG. 6 managing example commands fetched from the host 606, in accordance with some embodiments of the present disclosure. Although FIG. 7 shows two virtual machines (e.g., 611 and 613) in host 606, and two queue groups (e.g., first queue group 610 and second queue group 612), each associated with a virtual machine, host 606 may include more than two virtual machines and device 602 may include more than two associated queue groups. The virtual machine 611 is associated with the first queue group 610, and the second virtual machine 613 is associated with the second queue group 612. For each respective additional virtual machine (e.g., a third virtual machine) in host 606, device 602 includes a corresponding additional queue group (e.g., a third queue group) associated with the respective additional virtual machine.

As illustrated in FIG. 7, the arbitration circuitry 603 of device 602 selects a virtual machine based on at least one of the first credits value and the second credits value for each of the virtual machines (e.g., first virtual machine 611 and second virtual machine 613) of host 606, and sends a signal 702 to the command fetch circuitry 607. Arbitration circuitry 603 determines a first credits value indicative of a number of commands capable of being fetched from a queue group (e.g., first queue group 610 and second queue group 612) associated with a respective virtual machine (e.g., first virtual machine 611 and second virtual machine 613. In some embodiments, the first credits value of a virtual machine is determined based on an amount of processing resources allocated for fetching a number of commands from the queue group associated with the virtual machine. Once the arbitration circuitry 603 determines the first credits value of the respective virtual machine (e.g., 611 and 613) of host 606, the arbitration circuitry 603 then determines a second credits value of the respective virtual machine. The second credits value of the respective virtual machine is indicative of a bandwidth for fetching at least one command from the queue group associated with the respective virtual machine. In some embodiments, the second credits value for a respective virtual machine determined by arbitration circuitry 603 as an amount of processing bandwidth allocated to fetch commands (e.g., data transfer size associated with fetched commands) from the queue group) associated with the virtual machine. In some embodiments, arbitration circuitry 603 determines a respective first credits value and second credits value for each virtual machine (e.g., 611 and 613) before selecting a virtual machine from which to fetch commands. Once the command fetch circuitry 607 receives signal 702 from the arbitration circuitry 603, the command fetch circuitry 607 generates a command fetch request 704.

The command fetch request 704 may include data indicative of the selected virtual machine from which device 602 is to fetch at least one command. In some embodiments, the command fetch request 704 is received by system memory 608 to fetch at least one command from the queue group (e.g., first queue group 610 and second queue group 612) associated with the selected virtual machine. In some embodiments, when the queue groups (e.g., first queue group 610 and second queue group 612) are stored on host 606, the command fetch request 704 is communicated to host 606 to fetch at least one command from a queue group associated with the selected virtual machine. In some embodiments, command fetch circuitry 607 determines whether the signal 702 was received from the arbitration circuitry 603. When the command fetch circuitry 607 does not receive signal 702 from the arbitration circuitry 603, i.e., the signal 702 is lost or corrupted during the transit from the arbitration circuitry 603, the arbitration circuitry 603 may then resend signal 702 to the command fetch circuitry 607 to fetch at least one command from the queue group associated with the selected virtual machine. In some embodiments, the queue set (e.g., 614, 616, 618, 620, 622, 624, and 626) of the queue group (e.g., 610 and 612) associated with the selected virtual machine from which commands are fetched is selected at random. In some embodiments, the command fetch circuitry 607 fetches commands until any one of the following conditions are met: (a) each command stored in the queue group associated with the selected virtual machine has been fetched, (b) the first credits value of the selected virtual machine has decreased below a halting first credits value, (c) the second credits value of the selected virtual machine has decreased below a halting second credits value, and (d) the command fetch circuitry receives a reset signal. The command fetch circuitry 607 fetches commands which are stored in the submission queue of the queue sets within the queue group associated with the selected virtual machine. Once a command is fetched from the submission queue, the system memory generates command fetch response 706 which includes at least one fetched command and relevant information regarding the at least one fetched command (e.g., command type and data size). In some embodiments, when the command fetch circuitry 607 fetches commands from queue groups stored on host 606, host 606 generates the command fetch response 706 which includes at least one fetched command. The command fetch response 706 may be stored in the corresponding completion queue of the queue set from which the command was fetched. The command fetch response 706 is then communicated to the command fetch circuitry 607.

Once command fetch circuitry 607 receives command fetch response 706 from a respective virtual machine (e.g., first virtual machine 611 and second virtual machine 613), the command fetch circuitry 607 communicates a signal 708 to arbitration circuitry 604 to decrement the first credits value of the respective virtual machine, and communicates the fetched command 710 of the command fetch response 706 to processing circuitry 604 for execution. In some embodiments, for each command fetched from a respective virtual machine (e.g., 611 and 613), command fetch circuitry 607 sends a signal (e.g., signal 708) to arbitration circuitry 603 to decrement the first credits value of the respective virtual machine. In some embodiments, fetched command 710 is extracted from the command fetch response 706.

Once processing circuitry 604 receives fetched command 710, processing circuitry 604 executes the fetched command 710. In some embodiments, the fetched command 710 is a read command, which includes a memory address from which to access read data in memory 605 of device 602. In other embodiments, the fetched command 710 is a write command, which includes write data and a memory address at which to store the write data in memory 605. In some embodiments, processing circuitry 604 communicates a signal 712 to arbitration circuitry 603, where signal 712 includes information indicative of the type of command and data transfer size of the fetched command 710. This data included in signal 712 may be used to decrease the second credits value of the virtual machine from which the fetched command 710 originates.

When arbitration circuitry 603 receives either signal 708 from command fetch circuitry 607 or signal 712 from processing circuitry 604, one or more of first credits value and second credits value of the selected virtual machine may be updated. For example, signal 708 from command fetch circuitry 607 may indicate that a respective number of commands have been fetched from a respective virtual machine, and therefore the arbitration circuitry 603 should reduce the first credits value of the respective virtual machine by the respective number of commands which have been fetched. Additionally, each command of the respective number of commands fetched from the respective virtual machine has a respective data transfer size. Signal 712 from processing circuitry 604 includes the respective data transfer size of each command, and therefore the arbitration circuitry 603 should reduce the second credits value of the respective virtual machine by the respective data transfer size of each command of the respective number of commands which have been fetched. In some embodiments, processing circuitry 604 may communicate another signal to arbitration circuitry 603 to increase or reset one or more of the first credits value and the second credits value of a respective virtual machine. For example, each of the first credits value and second credits value may be increased due to refills of first credits value and second credits value, respectively. In some embodiments refills occur once after a repeated refill timer has completed one cycle. This ensures that device 606 is allocated with the processing resources and processing bandwidth resources to fetch commands from each respective virtual machine (e.g., 611 and 613) of the host 606. In some embodiments, either of the first credits value and second credits value is also updated by the completion of a cycle of a carryover timer, which is used to reset either the first credits value or the second credits value to a respective initial first credits value or initial second credits value to ensure a steady state exchange of processing resources or processing bandwidth resources to fetch commands from the virtual machine (e.g., 611 and 613) of the host 606.

Figures 8A, 8B:
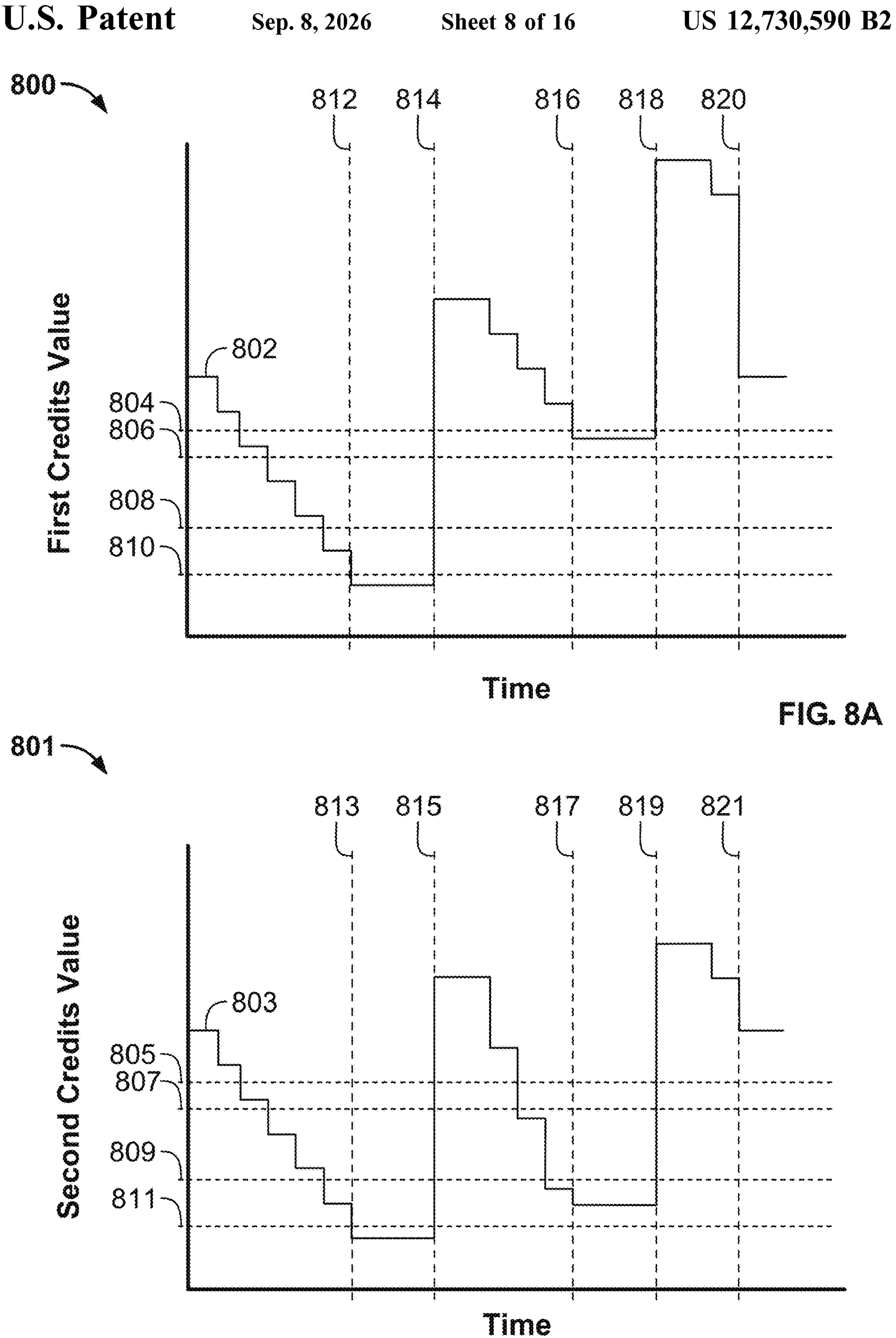
FIG. 8A shows a graph depicting changes to a first credits value over time, in accordance with some embodiments of the present disclosure.
FIG. 8B shows a graph of second credits value over time, in accordance with some embodiments of the present disclosure.

FIG. 8A shows a graph 800 of first credits value over time for an implementation of the device of FIG. 6, in accordance with some embodiments of the present disclosure. In some embodiments, the first credits value of a virtual machine is determined based on an amount of processing resources allocated for fetching a number of commands from the queue group associated with the virtual machine. The first credits value may be initialized at an initial state (e.g., first state) and an initial first credits value 802, which may be preset prior to operation of the device. The first credits value of a respective virtual machine may be updated over time, such that the first credits value decreases as commands are fetched from the queue group associated with the respective virtual machine. The first credits value may be increased due to a refill of first credits value. In some embodiments refills occur once after a repeated refill timer has completed one cycle (e.g., at times 814 and 818). This ensures that the device is allocated with the processing resources to fetch commands from each respective virtual machine of the host. In some embodiments, the first credits value is also updated by the completion of a cycle of a carryover timer (e.g., at time 820), which is used to reset the first credits value to a respective initial first credits value 802 to ensure a steady state exchange of processing resources to fetch commands from the virtual machine of the host.

The cycle time of the carryover timer is configured to be greater than the cycle time of the refill timer. In some embodiments, the amount of first credits value added at the completion of a refill timer (e.g., at times 814 and 818) is a preset constant for a respective virtual machine. In some embodiments, each respective virtual machine has a respective and different initial first credits value (e.g., initial first credits value 802) and a respective and different amount of first credits value added at the completion of a respective refill timer (e.g., at times 814 and 818) from other virtual machines in the host.

As shown in FIG. 8A, graph 800 includes predetermined values (e.g., predetermined values 804, 806, 808 and 810) with which arbitration circuitry may compare to the first credits value. In some embodiments, predetermined value 810 may hereafter be referred to as halting first credits value 810. The halting first credits value 810 may be indicative of the number of commands capable of being fetched from the respective virtual machine at which the arbitration circuitry should pause selecting the respective virtual machine when determining from which queue groups to fetch commands. In the example provided in graph 800, the respective virtual machine has five possible states for the first credits value: (a) a first state when the first credits value is greater than or equal to predetermined value 804, (b) a second state when the first credits value is less than predetermined value 804 and greater than or equal to predetermined value 806, (c) a third state when the first credits value is less than predetermined value 806 and greater than or equal to predetermined value 808, (d) a fourth state when the first credits value is less than predetermined value 808 and greater than or equal to halting first credits value 810, and (e) a fifth state, or halting state, when the first credits value is less than the halting first credits value 810.

In some embodiments, each predetermined value (e.g., 804, 806, 808, and 810) is configured based on a priority to fetch commands from a queue group associated with the respective virtual machine at a respective amount of processing resources to fetch commands to fetch commands. For example, the first state is of a higher priority than the second state, such that the arbitration circuitry would select a first virtual machine of a first state over a second virtual machine of a second state from which to fetch commands.

As command fetch circuitry of the device fetches command from the respective virtual machine, first credits value decrease from the initial first credits value 802, which is in the first state, and as time continues falls through each of the second state, third state, and fourth state. At time 812, the first credits value is reduced by at least one fetched command from the queue group associated with the respective virtual machine such that the first credits value drops below the halting first credits value 810. The first credits value remains in the halting state for a number of cycles as the arbitration circuitry will not select the respective virtual machine for further command fetching arbitration, until time 814. At time 814, a cycle of the refill timer has completed, and the first credits value has been increased to allocate processing resources to fetch commands from the respective virtual machine such that the respective virtual machine is within the first state for first credits value.

After time 814, arbitration circuitry selects the respective virtual machine for further command fetching, reducing the first credits value until the first credits value drops into the second state at time 816. In some examples, the arbitration circuitry may select another respective virtual machine of a higher state (e.g., the first state) from which to fetch commands, and therefore the first credits value of the respective virtual machine remains unchanged until time 818, where refill timer has completed another cycle. At time 820, a cycle of the carryover timer of the respective virtual machine has completed, resetting the first credits value of the respective virtual machine to the initial first credits value 802. The carryover timer is configured to ensure a steady state exchange of processing resources to fetch commands from the respective virtual machine.

FIG. 8B shows a graph 801 of second credits value over time for an implementation of the device of FIG. 6, in accordance with some embodiments of the present disclosure. In some embodiments, the second credits value of a virtual machine is determined based on an amount of processing bandwidth resources allocated for fetching commands from the queue group associated with the respective virtual machine. The second credits value may be initialized at an initial state (e.g., first state) and an initial second credits value 803, which may be preset prior to operation of the device. The second credits value of a respective virtual machine may be updated over time, such that the second credits value decreases as commands are fetched from the queue group associated with the respective virtual machine. The second credits value may be increased due to a refill of second credits value. In some embodiments refills occur once after a repeated refill timer has completed one cycle (e.g., at times 815 and 819). This ensures that the device is allocated with the processing bandwidth resources to fetch commands from each respective virtual machine of the host. In some embodiments, the second credits value is also updated by the completion of a cycle of a carryover timer (e.g., at time 821), which is used to reset the second credits value to a respective initial second credits value 803 to ensure a steady state exchange of processing bandwidth resources to fetch commands from the virtual machine of the host.

In some embodiments, the amount of second credits value added at the completion of a refill timer (e.g., at times 815 and 819) is a preset constant for a respective virtual machine. In some embodiments, each respective virtual machine has a respective and different initial second credits value (e.g., initial second credits value 802) and a respective and different amount of second credits value added at the completion of a respective refill timer (e.g., at times 815 and 819) from other virtual machines in the host.

As shown in FIG. 8B, graph 801 includes predetermined values (e.g., predetermined values 805, 807, 809, and 811) with which arbitration circuitry may compare to the second credits value. In some embodiments, predetermined value 811 may hereafter be referred to as halting second credits value 811. The halting second credits value 811 may be indicative of the maximum amount of transferred data of the fetched commands from the respective virtual machine. Therefore, at halting second credits value 811 the arbitration circuitry pauses the selecting of the respective virtual machine when determining from which queue groups to fetch commands and fetch commands from another virtual machine of the host. In the example provided in graph 801, the respective virtual machine has five possible states for the second credits value: (a) a first state when the second credits value is greater than or equal to predetermined value 805, (b) a second state when the second credits value is less than predetermined value 805 and greater than or equal to predetermined value 807, (c) a third state when the second credits value is less than predetermined value 807 and greater than or equal to predetermined value 809, (d) a fourth state when the second credits value is less than predetermined value 809 and greater than or equal to halting second credits value 811, and (e) a fifth state, or halting state, when the second credits value is less than the halting second credits value 811.

In some embodiments, similar to those in FIG. 8A, each predetermined value (e.g., 805, 807, 809, and 811) shown in FIG. 8B is configured based on a priority to fetch commands from a queue group associated with the respective virtual machine at a respective amount of processing bandwidth resources to fetch commands. For example, the first state is of a higher priority than the second state, such that the arbitration circuitry would select a first virtual machine of a first state over a second virtual machine of a second state from which to fetch commands.

As command fetch circuitry of the device fetches command from the respective virtual machine, second credits value decrease from the initial second credits value 803, which is in the first state and as time continues falls through each of the second state, third state, and fourth state. At time 813, the second credits value is reduced by at least one fetched command from the queue group associated with the respective virtual machine such that the second credits value drops below the halting second credits value 811. The second credits value remains in the halting state for a number of cycles as the arbitration circuitry will not select the respective virtual machine for further command fetching arbitration, until time 815. At time 815, a cycle of the refill timer has completed, and the second credits value has been increased to allocate processing bandwidth resources to fetch commands from the respective virtual machine such that the respective virtual machine is within the first state for second credits value.

After time 815, arbitration circuitry selects the respective virtual machine for further command fetching, reducing the second credits value based on the data transfer size of each fetched command until the second credits value drops into the second state at time 817. In some examples, the arbitration circuitry may select another respective virtual machine of a higher state (e.g., the first state) from which to fetch commands, and therefore the second credits value of the respective virtual machine remains unchanged until time 819, where refill timer has completed another cycle. At time 821, a cycle of the carryover timer of the respective virtual machine has completed, resetting the second credits value of the respective virtual machine to the initial second credits value 803. The carryover timer is configured to ensure a steady state exchange of processing bandwidth resources to fetch commands from the respective virtual machine.

Figure 9:
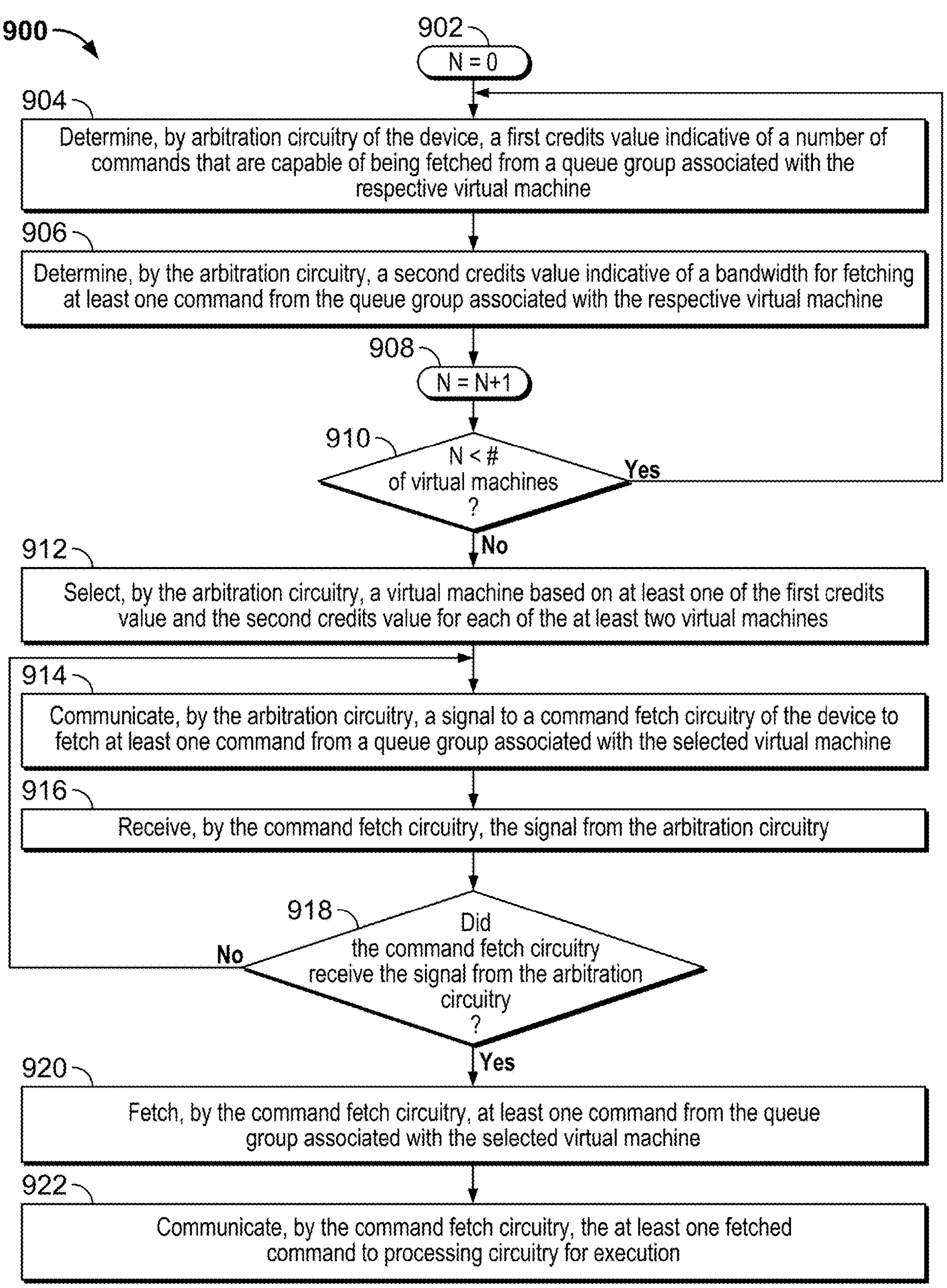
FIG. 9 shows a flowchart of illustrative steps of a process for managing command fetches for a device, in accordance with some embodiments of the present disclosure.

FIG. 9 shows a flowchart of illustrative steps of a process 900 for managing command fetches for a device, in accordance with some embodiments of the present disclosure. In some embodiments, the referenced system, device, arbitration circuitry, processing circuitry, memory, host, command fetch circuitry, system memory, queue groups, virtual machines, and queue sets may be implemented/represented as system 600, device 602, arbitration circuitry 603, processing circuitry 604, memory 605, host 606, command fetch circuitry 607, system memory 608, queue groups (e.g., 610, 612), virtual machines (e.g., 611, 613) and queue sets (e.g., 614, 616, 618, 620, 622, 624, 626). In some embodiments, process 900 can be modified by, for example, having steps rearranged, changed, added, and/or removed.

At step 902, process 900 initializes counter N to 0, as following steps 904-910 form a loop to evaluate each queue group associated with the virtual machines of the host. In some embodiments, the queue groups and their respective queue sets are allocated in the system memory of the device. Step 902, along with steps 908 and 910 are illustrated to indicate that counter N may be updated or compared to other values in order to proceed to other steps. Although FIG. 9 shows counter N used for process 900, a counter N is not necessarily implemented in the device for arbitration circuitry to evaluate each of the queue groups allocated in system memory. Once counter N is initialized, process 900 proceeds to step 904.

At step 904, the arbitration circuitry of the device determines a first credits value indicative of a number of commands capable of being fetched from a queue group associated with the respective virtual machine (e.g., virtual machine N). In some embodiments, the first credits value for a respective virtual machine (e.g., virtual machine N) determined by arbitration circuitry as a number of commands (e.g., Input/Outputs (I/Os)) which may be fetched from the queue group (e.g., queue group N) of the associated virtual machine. In some embodiments, the first credits value of a virtual machine is determined based on an amount of processing resources allocated for fetching a number of commands from the queue group associated with the virtual machine. The first credits value may be initialized at an initial state and an initial first credits value, which may be preset prior to operation of the device. The first credits value of a respective virtual machine may be updated over time, such that the first credits value decreases as commands are fetched from the queue group associated with the respective virtual machine. In addition, the first credits value may be increased due to a refill of first credits value. In some embodiments refills occur once after a repeated refill timer has completed one cycle. This ensures that the device is allocated with the processing resources to fetch commands from each respective virtual machine of the host. In some embodiments, the first credits value is also updated by the completion of a cycle of a carryover timer, which is used to reset the first credits value to a respective initial first credits value to ensure a steady state exchange of processing resources to fetch commands from the virtual machine of the host. Once the arbitration circuitry determines the first credits value of the respective virtual machine (e.g., virtual machine N) of the host, the arbitration circuitry then determines a second credits value of the respective virtual machine, at step 906.

At step 906, the arbitration circuitry of the device determines a second credits value indicative of a bandwidth for fetching at least one command from the queue group associated with the respective virtual machine (e.g., virtual machine N). In some embodiments, the second credits value for a respective virtual machine (e.g., virtual machine N) determined by arbitration circuitry as an amount of processing bandwidth allocated to fetch commands (e.g., amount of data associated with fetched commands) from the queue group (e.g., queue group N) of the associated virtual machine. In some embodiments, the second credits value of a virtual machine is determined based on an amount of processing bandwidth resources allocated for fetching an amount of data associated with commands of the queue group associated with the virtual machine. The second credits value may be initialized at an initial state and an initial second credits value, which may be preset prior to operation of the device. The second credits value of a respective virtual machine may be updated over time, such that the second credits value decreases as commands are fetched from the queue group associated with the respective virtual machine. In addition, the second credits value may increase due to a refill of the second credits value. In some embodiments refills occur once after a repeated refill timer has completed one cycle. This ensures that the device is allocated with the processing bandwidth resources to fetch commands of a certain data size from each respective virtual machine of the host. In some embodiments, the second credits value is also updated by the completion of a cycle of a carryover timer, which is used to reset the second credits value to a respective initial second credits value to ensure a steady state exchange of processing bandwidth resources to fetch commands from the virtual machine of the host. Once the arbitration circuitry determines the second credits value of the respective virtual machine (e.g., virtual machine N) of the host, the arbitration circuitry then proceeds to step 908 to increment counter N.

At step 908, counter N is incremented by one value. Counter N is incremented in order for arbitration circuitry to evaluate another queue group associated with another virtual machine of the host. Once counter N is incremented, process 900 then proceeds to step 910 to determine whether there are further queue groups to be evaluated.

At step 910, counter N is compared to the number of virtual machines in the host. In some embodiments, the number of virtual machines in the host is a same number as the number of queue groups. This comparison is indicative of whether there is at least one virtual machine and associated queue group which has yet to be evaluated by steps 904 and 906. When counter N is less than the number of virtual machines, process 900 proceeds to step 904 in order to evaluate another respective virtual machine (e.g., virtual machine N+1) and corresponding queue group. When counter N is greater than or equal to the number of virtual machines, each of the virtual machines of the host, and their corresponding queue groups have been evaluated and process 900 proceeds to step 912 to select a virtual machine based on at least one of the first credits value and the second credits value for each of the virtual machines evaluated at steps 904 and 906.

At step 912, the arbitration circuitry selects a virtual machines based on at least one of the first credits value and the second credits value for each of the virtual machines of the host. In some embodiments, arbitration circuitry determines a state for each of the first credits value and the second credits value of the virtual machine. The state of the first credits value is based on the first credits value and at least a first predetermined value. The state of the second credits value is based on the second credits value and at least a second predetermine value. In some embodiments, as shown in FIG. 8A and FIG. 8B, each state of the first credits value and the second credits value is determined based on more than one predetermined value. In some embodiments, each predetermined value for the first credits value and second credits value may be preset prior to operation of the device and command fetch arbitration. In some embodiments, each predetermined value is configured based on a priority to fetch commands from a queue group associated with a virtual machine at a respective amount of processing resources to fetch commands or a respective amount of processing bandwidth resources to fetch commands. For example, when the state of each of the first credits value is based on one predetermined value (e.g., first predetermined value for first credits value and second predetermined value for second credits value), there are two possible states (e.g., a first state and a second state) that may be determined for each of the first credits value and a second credits value. In such an example, the first state is of a higher priority than the second state, such that the arbitration circuitry selects a first virtual machine of a first state over a second virtual machine of a second state from which to fetch commands, wherein each of the first state and second state refers to either a state of first credits value or a state of second credits value. The arbitration circuitry is configured to select the virtual machine based on at least one of a highest state of first credits value and a highest state of second credits value. In some embodiments, when two or more respective virtual machines of the virtual machines of the host are of the same first credits value state and second credits value state, the arbitration circuitry randomly selects among the two or more respective virtual machines. In some embodiments, when two or more respective virtual machines of the virtual machines of the host are of the same first credits value state and second credits value state, the arbitration circuitry selects among the two or more respective virtual machines using a weighted priority selection. Therefore, when first virtual machine of a high priority and a second virtual machine of low priority are of the same first credits value state and second credits value state, the arbitration circuitry selects the first virtual machine and associated queue group from which to fetch commands. In some embodiments, the arbitration circuitry selects a virtual machine based on the first credits value for each of the at least two virtual machines of the host. In some embodiments, the arbitration circuitry selects a virtual machine based on the second credits value for each of the at least two virtual machines of the host. Once the arbitration circuitry selects a virtual machine based on at least one of the first credits value and the second credits value for each of the at least two virtual machines, the arbitration circuitry communicates a signal to the command fetch circuitry to fetch at least one command from the queue group associated with the selected virtual machine, at step 914.

At step 914, the arbitration circuitry communicates a signal to the command fetch circuitry of the device to fetch at least one command from a queue group associated with the selected virtual machine. In some embodiments, the signal includes data indicative of the selected virtual machine from which to fetch at least one command. Once the arbitration circuitry communicates the signal to the command fetch circuitry to fetch at least one command from the queue group associated with the selected virtual machine, the command fetch circuitry receives the signal from the arbitration circuitry, at step 916.

At step 916, the command fetch circuitry receives the signal from the arbitration circuitry. Once the command fetch circuitry receives the signal from the arbitration circuitry, the command fetch circuitry determines whether the signal was received from the arbitration circuitry, at step 918.

At step 918, the command fetch circuitry determines whether the signal was received from the arbitration circuitry. When the command fetch circuitry does not receive the signal from the arbitration circuitry, i.e., the signal is lost or corrupted during the transit from the arbitration circuitry, the arbitration circuitry then communicates the signal to the command fetch circuitry of the device to fetch at least one command from the queue group associated with the selected virtual machine, at step 914. When the command fetch circuitry does receive the signal from the arbitration circuitry, the command fetch circuitry fetches at least one command from the queue group associated with the selected virtual machine, at step 920.

At step 920, the command fetch circuitry fetches at least one command from the queue group associated with the selected virtual machine. In some embodiments, the command fetch circuitry sends at least one command fetch request to system memory to fetch at least one command from the queue group associated with the selected virtual machine. In some embodiments, the command fetch circuitry sends at least one command fetch request to the host to fetch at least one command from the queue group associated with the selected virtual machine stored on the host. The command fetch request may include data indicative of the virtual machine from which to fetch commands and a number of commands to be fetched from the associated queue group. The commands fetched from the queue group associated with the selected virtual machine may be from at least one of the queue sets of the queue group. In some embodiments, commands are fetched from queue sets of the queue group associated with the selected virtual machine based on a respective priority of each queue set. Therefore, a first subset of commands fetched from a first queue set of the queue group may be of a high priority, and a second subset of commands subsequently fetched from a second queue set of the queue group may be of a lower priority. In some embodiments, the queue set of the queue group associated with the selected virtual machine from which commands are fetched is selected at random. In some embodiments, the command fetch circuitry fetches commands until any one of the following conditions are met: (a) each command stored in the queue group associated with the selected virtual machine has been fetched, (b) the first credits value of the selected virtual machine has decreased below a halting first credits value, (c) the second credits value of the selected virtual machine has decreased below a halting second credits value, and (d) the command fetch circuitry receives a reset signal. The command fetch circuitry fetches commands which are stored in the submission queue of the queue sets within the queue group associated with the selected virtual machine. Once a command is fetched from the submission queue, the system memory generates a command fetch response which includes at least one fetched command and relevant information regarding the at least one fetched command (e.g., command type and data size). In some embodiments, when the command fetch circuitry fetches commands from queue groups stored on the host, the host generates the command fetch response which includes at least one fetched command. The command fetch response may be stored in the corresponding completion queue of the queue set from which the command was fetched. When the command fetch circuitry fetches a command from the queue group associated with a respective virtual machine, the command fetch circuitry may communicate a signal to the arbitration circuitry to decrement the first credits value of the respective virtual machine to reflect a use of the processing resource to fetch commands from the respective virtual machine. In some embodiments, the command fetch circuitry may determine the data size of the fetched command based on the command fetch response. In such embodiments, the command fetch circuitry may communicate a signal to the arbitration circuitry to decrement the second credits value of the respective virtual machine to reflect the amount of bandwidth required to fetch the command of the command fetch response from the respective virtual machine. The command fetch response is then sent to the command fetch circuitry to be communicated to the processing circuitry for execution, at step 922.

At step 922, the command fetch circuitry communicates the at least one fetched command to processing circuitry for execution. In some embodiments, the processing circuitry communicates a signal to the arbitration circuitry to decrement the second credits value of the respective virtual machine to reflect the amount of bandwidth required to fetch the command of the command fetch response from the respective virtual machine.

Figure 10:
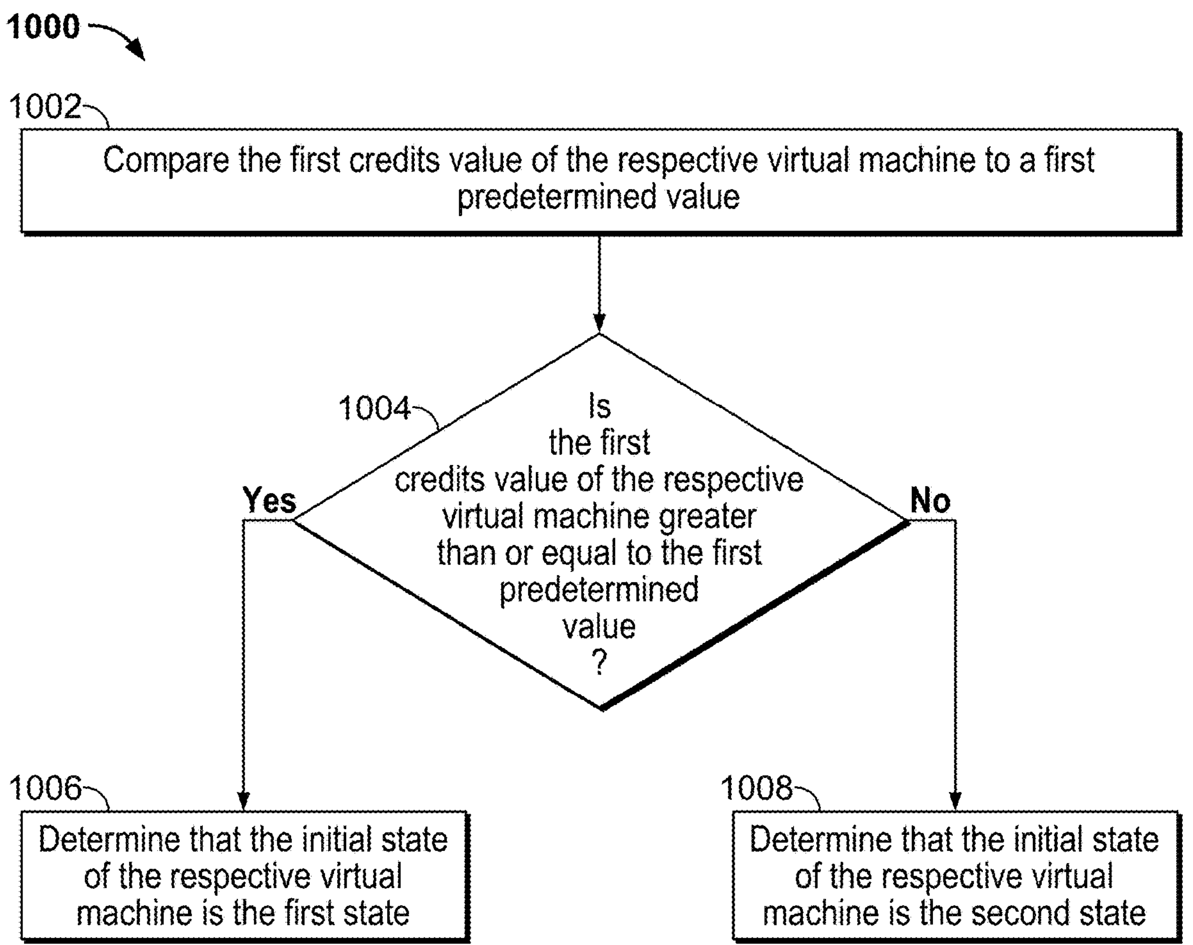
FIG. 10 shows a flowchart of illustrative steps of a subprocess for determining an initial state of a virtual machine of a host based on a first credits value, in accordance with some embodiments of the present disclosure.

FIG. 10 shows a flowchart of illustrative steps of a subprocess 1000 for determining an initial state of a virtual machine of the host based on a first credits value, in accordance with some embodiments of the present disclosure. In some embodiments, the referenced system, device, arbitration circuitry, processing circuitry, memory, host, command fetch circuitry, system memory, queue groups, virtual machines, and queue sets may be implemented/represented as system 600, device 602, arbitration circuitry 603, processing circuitry 604, memory 605, host 606, command fetch circuitry 607, system memory 608, queue groups (e.g., 610, 612), virtual machines (e.g., 611, 613) and queue sets (e.g., 614, 616, 618, 620, 622, 624, 626). In some embodiments, subprocess 1000 can be modified by, for example, having steps rearranged, changed, added, and/or removed.

At step 1002, the arbitration circuitry compares the first credits value of the respective virtual machine (e.g., virtual machine N) to a first predetermined value. In some embodiments, once the arbitration circuitry compares the first credits value of the respective virtual machine to the first predetermined value, the arbitration circuitry then compares the first credits value of the respective virtual machine to additional predetermined values. In some embodiments the first predetermined value may be configured based on a constant first credits value for each virtual machine. In some embodiments, each virtual machine has a respective first predetermined value, where each respective first predetermined value is not necessarily the same value. In some embodiments, the first predetermined value of a respective virtual machine is determined based on an amount of processing resources allocated for fetching commands from the queue group associated with the respective virtual machine. The first predetermined value for each virtual machine may be preset before the device fetches commands from the host. In some embodiments, the first predetermined value of the respective virtual machine be represented by a number of commands of a particular size. The first predetermined value for the respective virtual machine may be determined by a share of a total processing resources for fetching commands, which is defined by the processing capabilities of a processor of the command fetch circuitry. In some embodiments, one or more virtual machines may have a greater first predetermined value than other virtual machines. In some embodiments, the arbitration circuitry compares the first credits value of the respective virtual machine to a first predetermined value after each update to the first credits value (e.g., decrease after fetching a command, increase due to refill timer, and reset due to carryover timer). For example, as arbitration circuitry fetches commands from a queue group associated with the respective virtual machine, the first credits value decreases by the number of commands fetched. In some embodiments, the first predetermined value is a halting threshold value. The halting threshold value may be indicative of a number of commands of the respective virtual machine at which the arbitration circuitry should pause selecting the respective virtual machine when determining from which queue groups to fetch commands. Once the arbitration circuitry compares the first credits value of the respective virtual machine to the first predetermined value, the arbitration circuitry proceeds to determine whether the first credits value of the respective virtual machine is greater than or equal to the first predetermined value, at step 1004.

At step 1004, the arbitration circuitry determines whether the first credits value of the respective virtual machine (e.g., virtual machine N) is greater than or equal to the first predetermined value. When the first credits value of the respective virtual machine (e.g., virtual machine N) is greater than or equal to the first predetermined value, the arbitration circuitry determines that the initial state of the respective virtual machine (e.g., virtual machine N) is a first state, at step 1006. When the first credits value of the respective virtual machine (e.g., virtual machine N) is less than the first predetermined value, the arbitration circuitry determines that the initial state of the respective virtual machine (e.g., virtual machine N) is a second state, at step 1008.

At step 1006, the arbitration circuitry determines that the initial state of the respective virtual machine (e.g., virtual machine N) is the first state. When the arbitration circuitry determines that the first credits value of the respective virtual machine is greater than or equal to the first predetermined value based on the determination made at step 1004, the arbitration circuitry determines that the initial state of the respective virtual machine is the first state. In some embodiments, a first state of the first credits value is associated with a high priority and a second state of the first credits value is associated with a low priority. In some embodiments, the arbitration circuitry is more likely to select a virtual machine of a state with a higher priority (e.g., first state). In some embodiments, when there are additional predetermined values to which the arbitration circuitry compares the first credits value, there are also additional states (e.g., a third state) which may be determined as the initial state of the respective virtual machine. In such embodiments, the third state would be associated with a priority which is lower than that of the second state.

At step 1008, the arbitration circuitry determines that the initial state of the respective virtual machine (e.g., virtual machine N) is the second state. When the arbitration circuitry determines that the first credits value of the respective virtual machine is less than the first predetermined value based on the determination made at step 1004, the arbitration circuitry determines that the initial state of the respective virtual machine is the second state, which is of a lesser priority than the first state.

Figure 11:
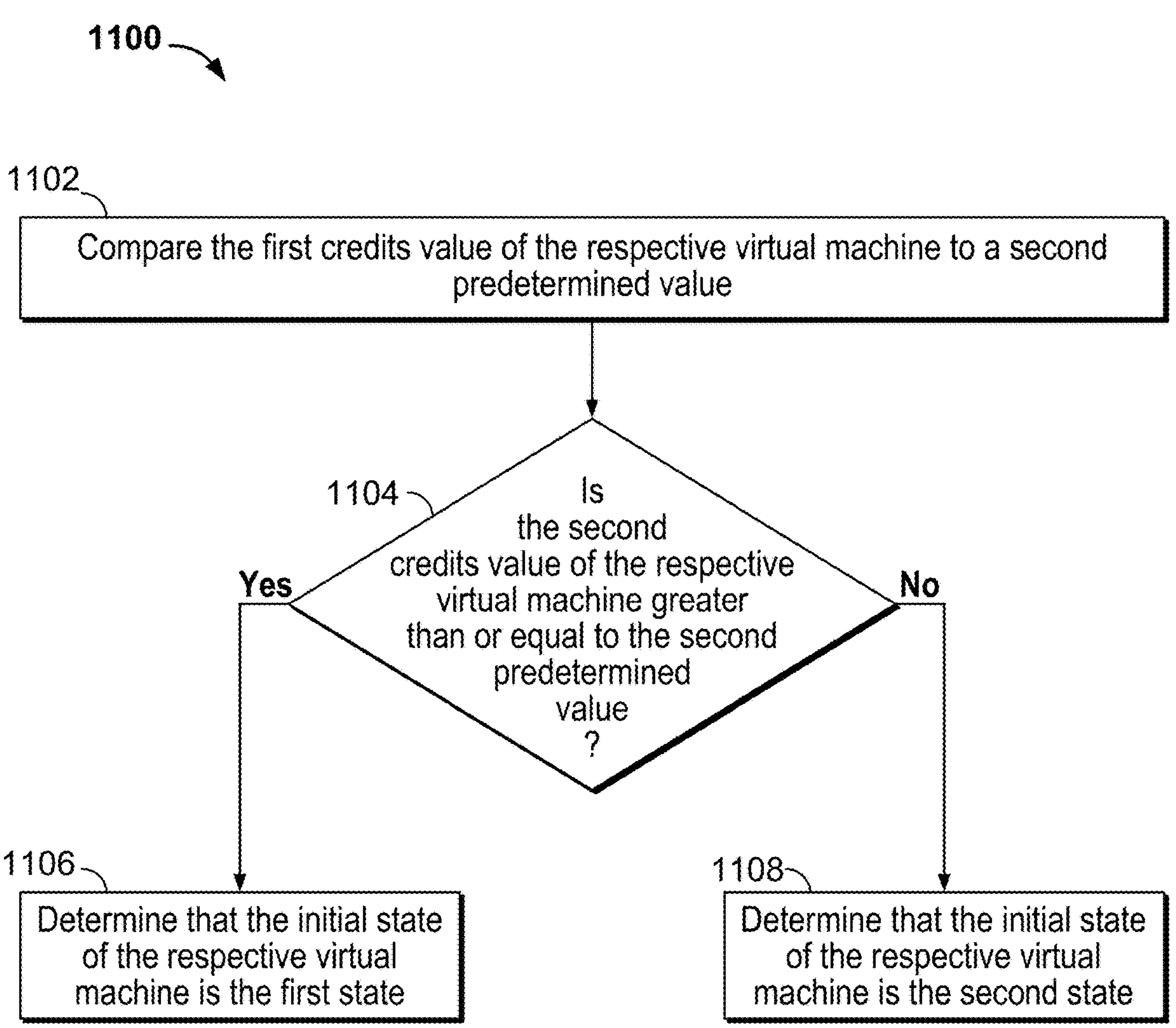
FIG. 11 shows a flowchart of illustrative steps of a subprocess for determining an initial state of a virtual machine of a host based on a second credits value, in accordance with some embodiments of the present disclosure.

FIG. 11 shows a flowchart of illustrative steps of a subprocess 600 for determining an initial state of a virtual machine of the host based on a second credits value, in accordance with some embodiments of the present disclosure. In some embodiments, the referenced system, device, arbitration circuitry, processing circuitry, memory, host, command fetch circuitry, system memory, queue groups, virtual machines, and queue sets may be implemented/represented as system 600, device 602, arbitration circuitry 603, processing circuitry 604, memory 605, host 606, command fetch circuitry 607, system memory 608, queue groups (e.g., 610, 612), virtual machines (e.g., 611, 613) and queue sets (e.g., 614, 616, 618, 620, 622, 624, 626). In some embodiments, subprocess 600 can be modified by, for example, having steps rearranged, changed, added, and/or removed.

At step 1102, the arbitration circuitry compares the second credits value of the respective virtual machine (e.g., virtual machine N) to a second predetermined value. In some embodiments, once the arbitration circuitry compares the second credits value of the respective virtual machine to the second predetermined value, the arbitration circuitry then compares the second credits value of the respective virtual machine to additional predetermined values. In some embodiments the second predetermined value may be configured based on a constant second credits value for each virtual machine. In some embodiments, each virtual machine has a respective second predetermined value, where each respective second predetermined value is not necessarily the same value. In some embodiments, the second predetermined value of a respective virtual machine is determined based on an amount of processing bandwidth resources allocated for fetching commands from the queue group associated with the respective virtual machine. The second predetermined value for each virtual machine may be preset before the device fetches commands from the host. In some embodiments, the second predetermined value of the respective virtual machine be represented by an amount of data for commands. The second predetermined value for the respective virtual machine may be determined by a share of a total processing bandwidth resources for fetching commands, which is defined by the processing capabilities of a processor of the command fetch circuitry. In some embodiments, one or more virtual machines may have a greater second predetermined value than other virtual machines. In some embodiments, the arbitration circuitry compares the second credits value of the respective virtual machine to a second predetermined value after each update to the second credits value (e.g., decrease after fetching a command, increase due to refill timer, and reset due to carryover timer). For example, as arbitration circuitry fetches commands from a queue group associated with the respective virtual machine, the second credits value decreases by an amount of data of the fetched commands. In some embodiments, the second predetermined value is a halting threshold value. The halting threshold value may be indicative of the amount of data needed to fetch commands from the respective virtual machine at which the arbitration circuitry should pause selecting the respective virtual machine when determining from which queue groups to fetch commands. Once the arbitration circuitry compares the second credits value of the respective virtual machine to the second predetermined value, the arbitration circuitry proceeds to determine whether the second credits value of the respective virtual machine is greater than or equal to the second predetermined value, at step 1104.

At step 1104, the arbitration circuitry determines whether the second credits value of the respective virtual machine (e.g., virtual machine N) is greater than or equal to the second predetermined value. When the second credits value of the respective virtual machine (e.g., virtual machine N) is greater than or equal to the second predetermined value, the arbitration circuitry determines that the initial state of the respective virtual machine (e.g., virtual machine N) is a first state, at step 1106. When the second credits value of the respective virtual machine (e.g., virtual machine N) is less than the second predetermined value, the arbitration circuitry determines that the initial state of the respective virtual machine (e.g., virtual machine N) is a second state, at step 1108.

At step 1106, the arbitration circuitry determines that the initial state of the respective virtual machine (e.g., virtual machine N) is the first state. When the arbitration circuitry determines that the second credits value of the respective virtual machine is greater than or equal to the second predetermined value based on the determination made at step 1104, the arbitration circuitry determines that the initial state of the respective virtual machine is the first state. In some embodiments, a first state of the second credits value is associated with a high priority and a second state of the second credits value is associated with a low priority. In some embodiments, the arbitration circuitry is more likely to select a virtual machine of a state with a higher priority (e.g., first state). In some embodiments, when there are additional predetermined values to which the arbitration circuitry compares the second credits value, there are also additional states (e.g., a third state) which may be determined as the initial state of the respective virtual machine. In such embodiments, the third state would be associated with a priority which is lower than that of the second state.

At step 1108, the arbitration circuitry determines that the initial state of the respective virtual machine (e.g., virtual machine N) is the second state. When the arbitration circuitry determines that the second credits value of the respective virtual machine is less than the second predetermined value based on the determination made at step 1104, the arbitration circuitry determines that the initial state of the respective virtual machine is the second state, which is of a lesser priority than the first state.

In some embodiments, FIGS. 1-11 show diagrams depicting one of command arbitration (e.g., as shown at least in FIGS. 1-5, and which may be referred to as determining a command limit, including based on command pool tracking) or throughput credit management (e.g., as shown at least in FIGS. 6-11, and which may be referred to determining a throughput limit, including based on throughput pool tracking). Building upon these approaches, FIGS. 12-15 show diagrams describing the combination of command pool and throughput pool tracking.

Toward managing command and throughput pools, in some embodiments, a submission queue (SQ)/completion queue (CQ) pair may be shared by multiple VEs, domains, and/or namespaces; in some embodiments, a group of SQ/CQ pairs are mapped to individual VEs, domains, or VE/domain tuples; and in some embodiments, a VE/domain pair sharing a QS is stored as a VE/domain tuple. As used herein, a queue set (QS) may include one or more SQ/CQ pairs.

Figure 12:
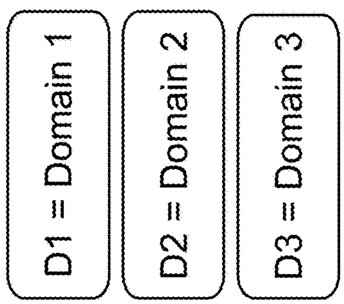
FIG. 12 shows a diagram for mapping multiple queue sets of multiple domains to virtual entities and namespaces, in accordance with some embodiments of the present disclosure.
Figure 12:
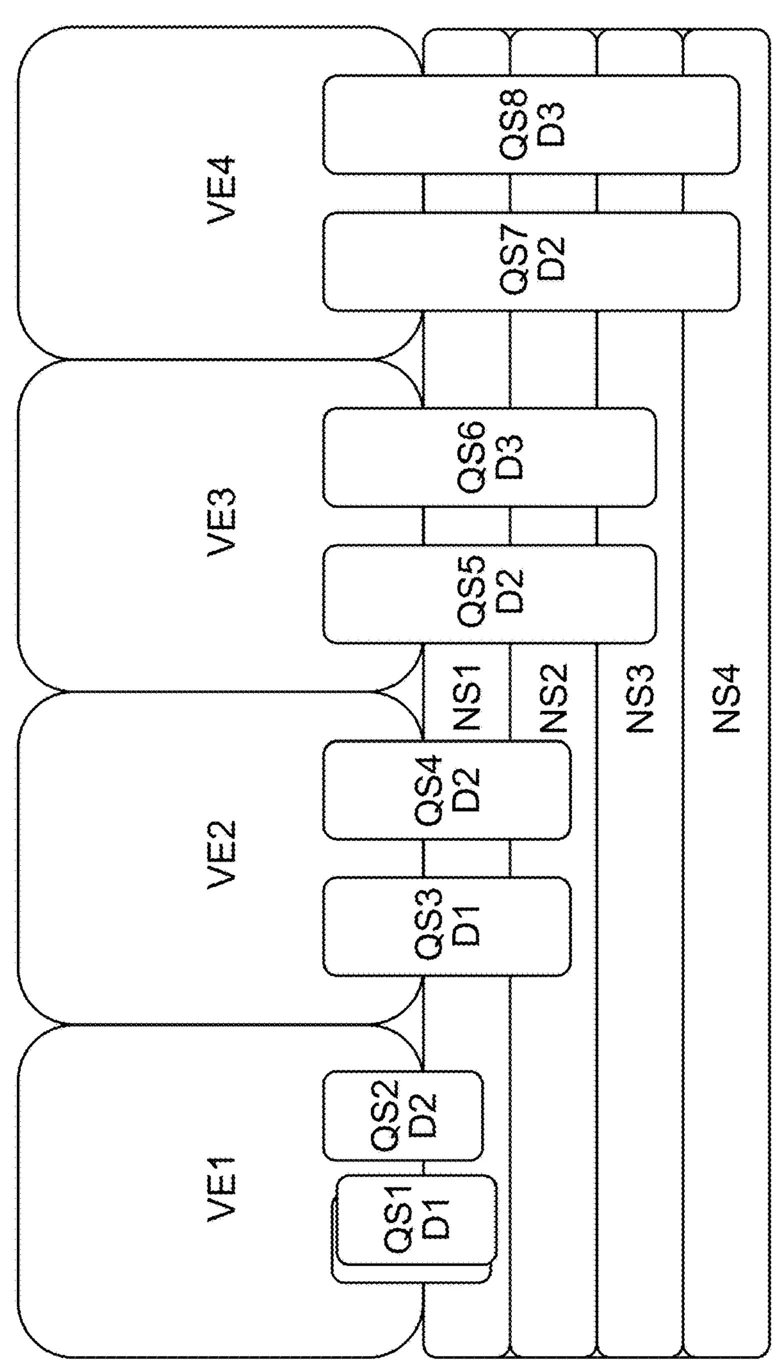

FIG. 12 shows a diagram for managing multiple queue sets corresponding to multiple domains, where the group of queue sets is mapped to multiple virtual entities and namespaces, in accordance with some embodiments of the present disclosure. As shown, each virtual entity (i.e., VE1 through VE4) is mapped to a unique namespace (i.e., NS1 through NS4) through at least one domain. While FIG. 12 shows a one-on-one mapping system (i.e., each VE is associated with exactly one namespace), this is merely illustrative; multiple VEs may share a namespace, or a single VE may be mapped to multiple namespaces.

In some embodiments, the queue sets of FIG. 12 may correspond to any one or more of queue sets 114, 116, 118, 120, 122, 124, or 126, any one or more of queue sets 314, 316, 318, 320, 322, 324, or 326, any one or more of queue sets 614, 616, 618, 620, 622, 624, or 626 or any combination thereof. In some embodiments, the virtual entities of FIG. 12 may correspond to virtual entities VE1, VE2, VE3, and VE4 in FIGS. 13-14. The throughput pools which are mapped to the VEs in FIG. 14 may correspond to the credit pools in FIG. 15. For example, Throughput Pool 1 may correspond to Credit Pool 1, Throughput Pool 2 may correspond to Credit Pool 2, and Throughput Pool 3 may correspond to Credit Pool 3. In some embodiments, the domains (i.e., Domain 1, Domain 2, and Domain 3) of FIG. 12 may correspond to domains (i.e., Domain 1, Domain 2, and Domain 3) in FIGS. 13-14. The command pools (i.e., Command Pool 1, Command Pool 2, and Command Pool 3) which are mapped to the domains in FIG. 14 may correspond to the command pools (i.e., Command Pool 1, Command Pool 2, and Command Pool 3) in FIG. 15. These virtual entities of FIG. 12 may, e.g., be applications executing on device 102 (e.g., on processing circuitry 104) or on device 602 (e.g., on processing circuitry 604, in connection with arbitration circuitry 603 and/or command fetch circuitry 607).

The mapping scheme of FIG. 12 is described as follows. Queue set 1 (QS1) is mapped to Domain 1 (D1) and to virtual entity 1 (VE1), which is further mapped to namespace 1 (NS1). Queue set 2 (QS2) is mapped to Domain 2 (D2) which is further mapped to VE1 and NS1. Queue set 3 (QS1) is mapped to Domain 1 (D1) and to virtual entity 2 (VE2), which is further mapped to namespace 2 (NS2). Queue set 4 (QS4) is mapped to Domain 2 (D2) which is further mapped to VE2 and NS2. Queue set 5 (QS5) is mapped to Domain 2 (D2) and to virtual entity 3 (VE3), which is further mapped to namespace 3 (NS3). Queue set 6 (QS6) is mapped to Domain 3 (D3) which is further mapped to VE3 and NS3. Queue set 7 (QS7) is mapped to Domain 2 (D2) and to virtual entity 4 (VE4), which is further mapped to namespace 4 (NS4). Queue set 8 (QS8) is mapped to Domain 3 (D3) which is further mapped to VE4 and NS4.

In some embodiments, multiple SQ/CQs may be provided by a host device at the same time or at overlapping times. In some embodiments, these multiple SQ/CQs may be included in the same QS, and may be mapped onto the same VE and domain, such as the two SQ/CQs shown within QS1 of FIG. 12 and mapped to both VE1 and D1. That is, respective queue sets of a plurality of queue sets (e.g., QS1 through QS8) may be of varying sizes. As shown in FIG. 12, illustrative QS1 is larger than the other illustrative QSs.

In some embodiments, multiple respective QSs are mapped to the same VE/Domain tuple, as illustrated in FIG. 12. Mapping multiple respective QSs to the same VE/Domain tuple may improve resource prioritization and hardware allocation. Based on the management approaches of this disclosure, this improved resource prioritization and hardware allocation can be realized without compromising on QoS, latency, or tenant fairness. For example, a single physical device can serve a greater number of QSs, which means that the single device can support a greater number of domains or a greater number of operations for a given domain. By increasing the number of domains and/or operations that a single device can support, hardware management may be made more optimized and efficient.

In some embodiments, based on the overlapping (e.g., in time) receipt of at least two respective QSs from a host, processing circuitry of a device may determine a priority for each QS. For example, the priority may determine: an order for processing the multiple QSs, a command limit for the QS, a throughput limit for the QS, a VE mapping, a domain mapping, a throughput pool mapping, a command pool mapping, or any combination thereof. In some embodiments, the priority is based on a property of a client application providing the queue sets (e.g., based on a subscription to the VE), or the priority is at least in part designated by the client (e.g., a single client may provide higher- and lower-priority QSs).

Figure 13:
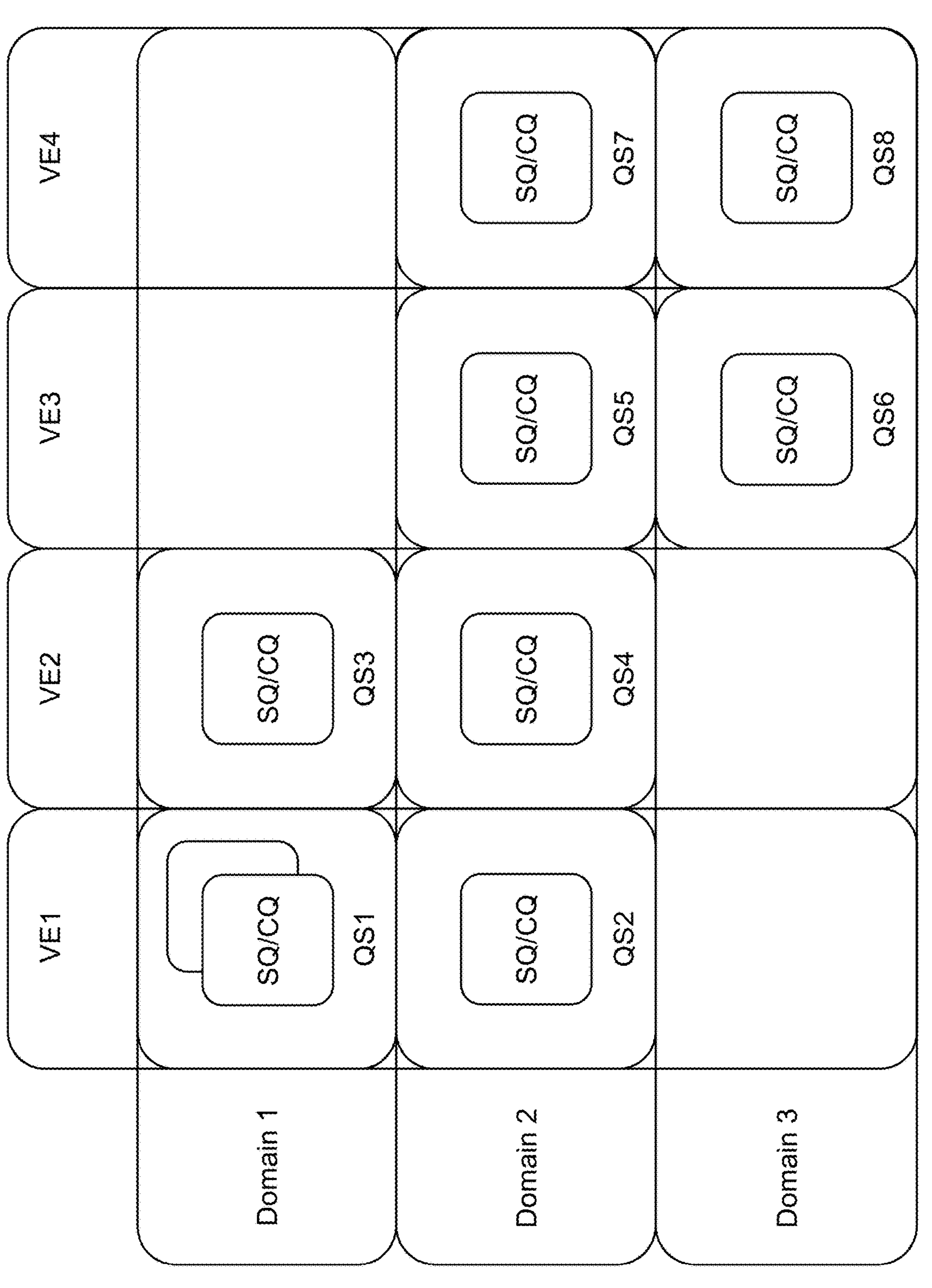
FIG. 13 shows a diagram for mapping queue sets to respective domain and virtual entity pairs, in accordance with some embodiments of the present disclosure.

FIG. 13 shows an illustrative mapping of multiple queue sets to respective domain and virtual entity pairs, in accordance with some embodiments of the present disclosure. To demonstrate the concept of VE/domain tuples, the four VEs (i.e., VE1 through VE4), three domains (i.e., Domain 1 through Domain 3), and eight QSs (i.e., QS1 through QS8) are taken from FIG. 12 and shown again in FIG. 13. In FIG. 13, each QS is mapped to a VE/domain tuple. As a result, each VE is connected to multiple domains, and each domain is connected to multiple VEs. Each QS may include group of submission queue (SQ)/completion queue (CQ) pairs.

The mapping scheme of FIG. 13 is described as follows. Queue set 1 (QS1) includes 2 SQ/CQ pairs mapped to VE1/Domain 1, similar to that in FIG. 12. Queue set 2 (QS2) is mapped to VE1 and Domain 2. Queue set 3 (QS3) is mapped to VE2 and Domain 1. Queue set 4 (QS4) is mapped to VE2 and Domain 2. Queue set 5 (QS5) is mapped to VE3 and Domain 2. Queue set 6 (QS6) is mapped to VE3 and Domain 3. Queue set 7 (QS7) is mapped to VE4 and Domain 2. Queue set 8 (QS8) is mapped to VE4 and Domain 3.

Where FIG. 12 depicts the mapping between the QSs, the VEs, and the NSs, FIG. 13 shows an additional mapping of these same elements (with certain Queue Sets renumbered, for ease of interpretation) based on respective VE/domain tuples. For the VE-QS-NS connections shown in FIG. 12, FIG. 13 shows VE/domain tuple mapping that may be used to define command and throughput pools, as well as how these pools may be shared across at least two QSs. The VE/domain tuple mapping may be used toward determining whether, for a QS associated with the VE/domain tuple, a command limit is greater than a number of outstanding commands and whether a throughput limit is greater than a required throughput.

Figure 14:
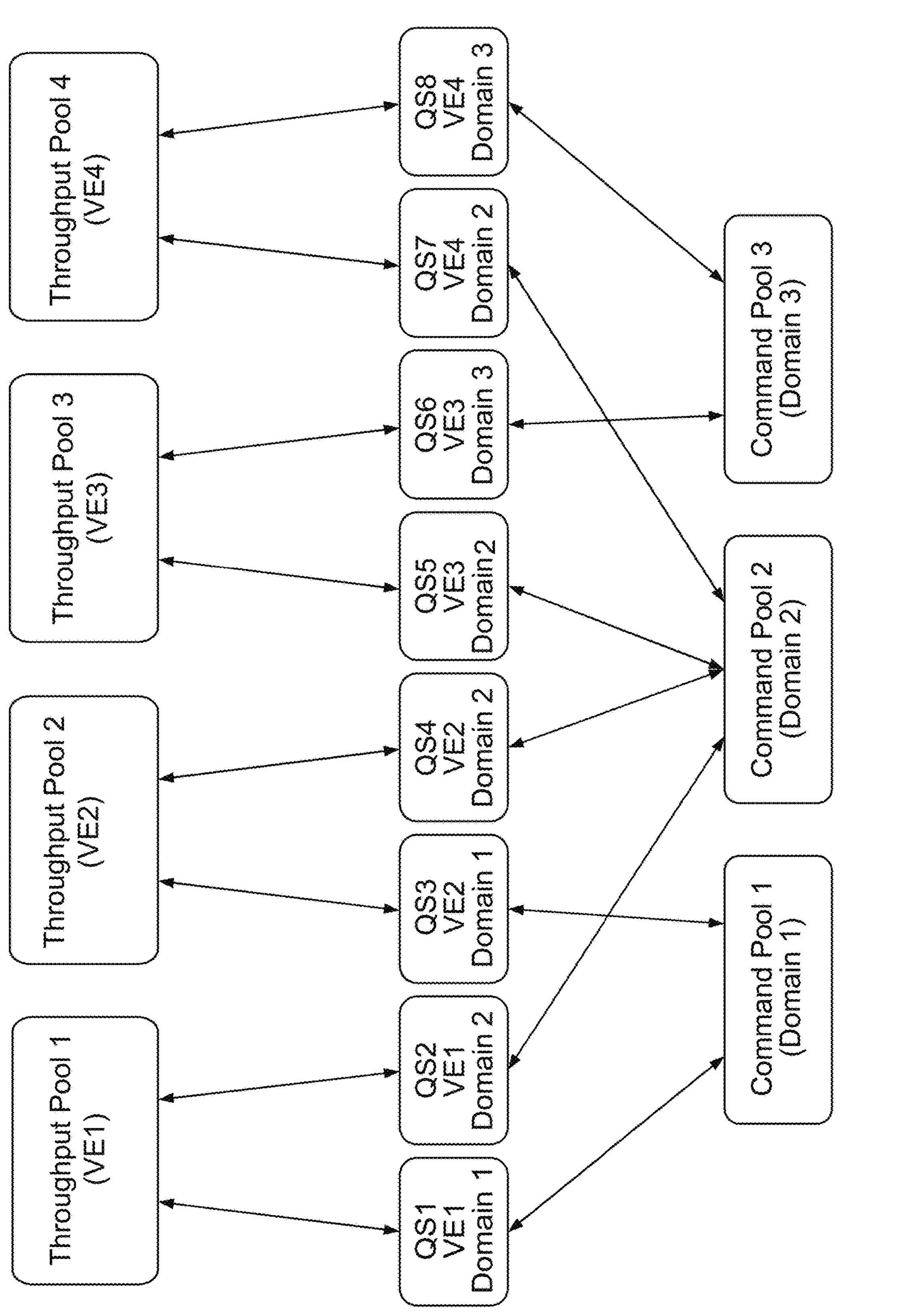
FIG. 14 shows a diagram for sharing command and throughput pools across multiple queue sets, in accordance with some embodiments of the present disclosure.

FIG. 14 shows a diagram of an allocation mapping for managing multiple overlapping queue sets based on command pool tracking and throughput pool tracking, in accordance with some embodiments of the present disclosure. As used in connection with FIG. 14, "overlapping" queue sets are queue sets that share at least one of a command pool (i.e., domain) or a credit pool (i.e., virtual entity) with each other. FIG. 14 shows another mapping of the elements of FIG. 13 to illustrate how these elements may share respective throughput and/or command pools.

The mapping of FIG. 14 is described as follows. Throughput Pool 1 is mapped to virtual entity 1 (VE1), Throughput Pool 2 is mapped to virtual entity 2 (VE2), Throughput Pool 3 is mapped to virtual entity 3 (VE3), and Throughput Pool 4 is mapped to virtual entity 4 (VE4). Command Pool 1 is mapped to Domain 1, Command Pool 2 is mapped to Domain 2, and Throughput Pool 3 is mapped to Domain 3. Similar to FIG. 13, queue set 1 (QS1) is mapped to VE1/Domain 1, queue set 2 (QS2) is mapped to VE1 and Domain 2, queue set 3 (QS3) is mapped to VE2 and Domain 1, queue set 4 (QS4) is mapped to VE2 and Domain 2, queue set 5 (QS5) is mapped to VE3 and Domain 2, queue set 6 (QS6) is mapped to VE3 and Domain 3, queue set 7 (QS7) is mapped to VE4 and Domain 2, and queue set 8 (QS8) is mapped to VE4 and Domain 3.

The VEs and Domains depicted in FIG. 14 can be the same as the VEs and domains of FIG. 13. Compared to FIG. 13, FIG. 14 shows how there are respective command pools mapped to certain QSs, and respective throughput pools mapped to certain QSs. Additionally, FIG. 14 depicts how each pool (i.e., command and/or throughput pool) may serve multiple QSs. Likewise, a single command pool may be shared across more than one VE, and a single throughput pool may be shared across more than one domain.

Figure 15:
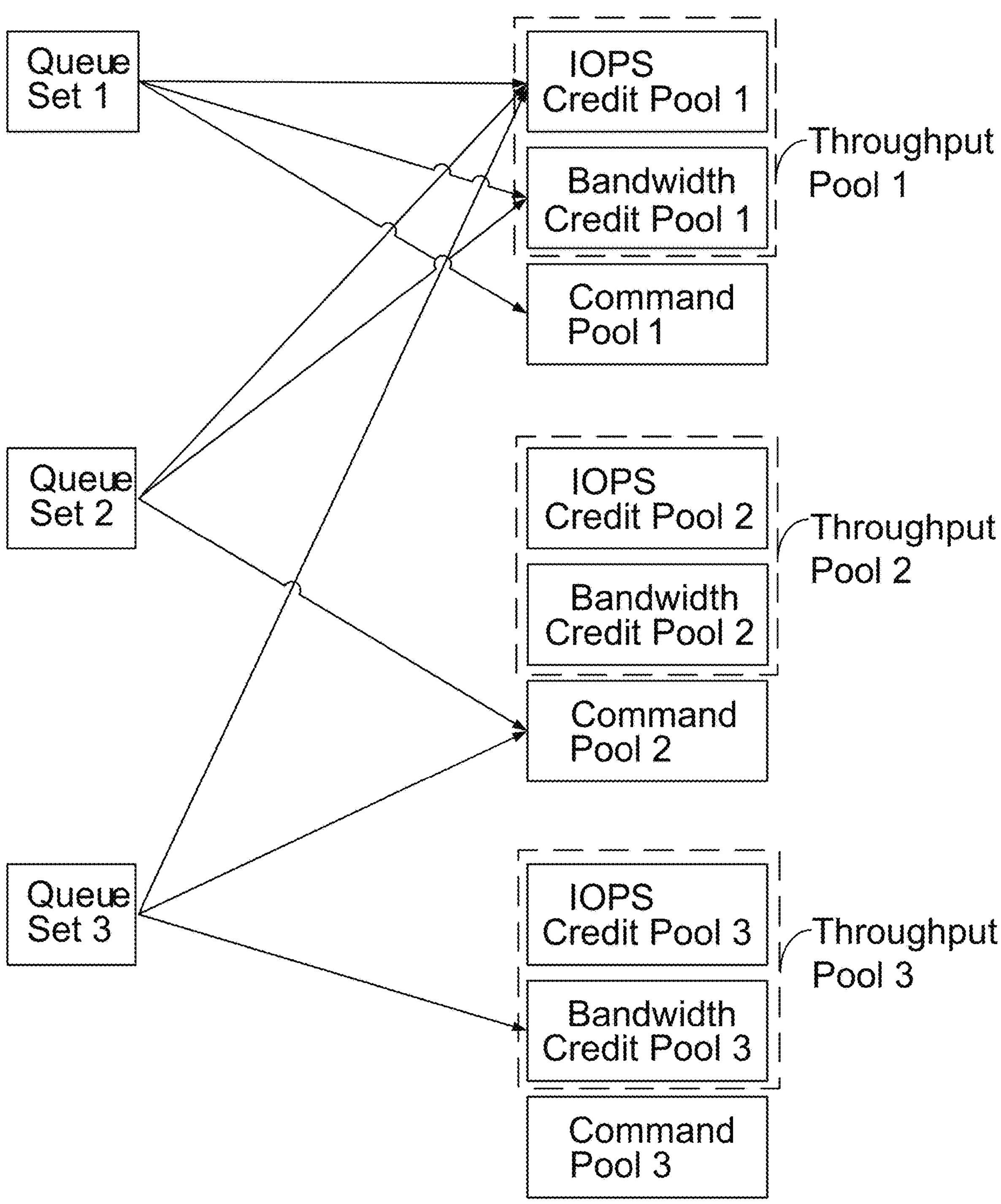
FIG. 15 shows a diagram of a mapping of multiple queue sets to various command, bandwidth, and IOPS pools, in accordance with some embodiments of the present disclosure.

FIG. 15 shows a diagram of a mapping of multiple queue sets to various command, bandwidth, and IOPS pools, in accordance with some embodiments of the present disclosure. FIG. 15 depicts the versatility of methods provided in this disclosure for mapping different throughput pools and command pools to a queue set, thereby providing flexibility in providing resources to execute the queue set. The queue sets of FIG. 15 may corresponding to any three of the queue sets QS1 through QS8, as shown in FIGS. 12-14.

As shown in FIG. 15, certain queue sets, such as Queue Set 1, may be mapped to related pools. For example, Throughput Pool 1, including IOPS Credit Pool 1 and Bandwidth Credit Pool 1, may be related to Command Pool 1 (e.g., based on having any logical association, which may be based on a priority, or based on being typically configured to serve related QSs, which may come from a single client). As also shown in FIG. 15, certain queue sets, such as Queue Set 2, may be mapped to unrelated pools. For example, Throughput Pool 1 may be unrelated to Command Pool 2, yet Queue Set 2 may be configured to have commands executed based on Command Pool 2, in association with throughput reserved from Throughput Pool 1. In some embodiments, based on the priority and/or based on a determined amount of traffic (e.g., on a virtual entity of a host, and/or on a domain), any respective QS may be dynamically mapped to any Command Pool or Throughput Pool (e.g., to access the resources required to execute the commands). Likewise, for a respective QS (e.g., among multiple queue sets sharing a single throughput or command pool), a throughput limit and/or a command limit may be based on the priority, the determined amount of traffic, or a combination thereof. Moreover, there may be throughput pools, such as Throughput Pool 2 in this example, and command pools, such Command Pool 3 in this example, which are not mapped to any queue set in a given moment.

FIG. 15 further depicts how the QSs may interact with the available command and throughput pools, including IOPS and BW pools, in some embodiments. Based on the demands of the QS, as well as how other QS's may require resources from the same pools, the QS may be executed, or it may be buffered. Moreover, connections between throughput/command pools and various QSs may be modified based on respective QS demands, priorities, amounts of traffic, other suitable considerations, or any combination thereof.

While FIGS. 12-15 show particular numbers of queue sets, virtual entities, domains, command pools, and throughput pools, all of these depictions are merely illustrative. Indeed, any suitable number of queue sets, virtual entities, domains, command pools, and throughput pools may be managed in connection with embodiments of this disclosure.

Figure 16:
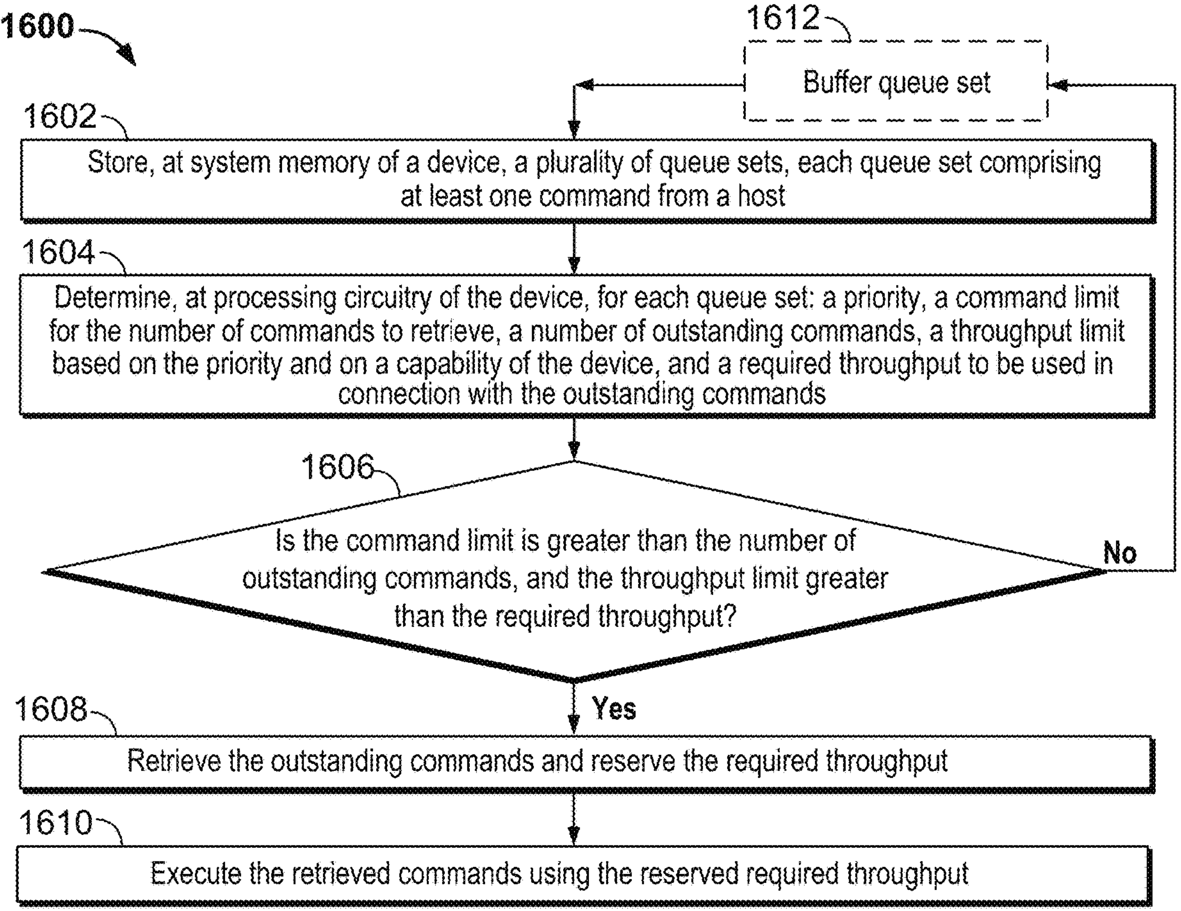
FIG. 16 shows a flowchart of illustrative steps of a process for managing command retrieval and execution, in accordance with some embodiments of the present disclosure.

FIG. 16 shows a flowchart of illustrative steps of a process 1600 for managing command retrieving while tracking throughput for a device, in accordance with some embodiments of the present disclosure. In some embodiments, process 1600 is executed by processing circuitry of a device that is communicatively coupled to a host. For example, the device may be an SSD device, the host may be an SSD controller or any other suitable host computer. In some embodiments, the queue sets described in connection with FIG. 16 include queue sets QS1 through QS8, as shown in FIGS. 13-15. In some embodiments, the command limit corresponds to the number of commands that can be retrieved from the command pools (i.e., Command Pool 1, Command Pool 2, and Command Pool 3), as shown and described at least in connection with FIGS. 14-15. In some embodiments, the throughput limit corresponds to the value of BW, the value of IOPS, or a lumped value considering BW and IOPS, that is available in the throughput pools, as shown and described at least in connection with FIGS. 14-15. This required throughput may to be used to retrieve and execute commands from the command pools in FIGS. 14-15. In some embodiments, the circuitry that is used to retrieve commands includes fetch circuitry 607. In some embodiments, the circuitry that is used to execute commands includes processing circuitry 104 or processing circuitry 604. In some embodiments, the circuitry that is used to evaluate whether a command limit is greater than a number of outstanding commands, and whether a throughput limit is greater than a required throughput, includes arbitration circuitry 603. In some embodiments, the host of FIG. 16 includes at least one virtual entity to receive the at least one command from a client application.

At step 1602, a plurality of QSs are stored at the system memory of a device, where each QS includes at least one command from the host. At step 1604, the processing circuitry determines, for each queue set, a priority, a command limit for the number of commands to retrieve, a number of outstanding commands (e.g., of the queue set) to retrieve, a throughput limit based on the priority and on a capability of the device, and a required throughput to be used in connection with the outstanding commands. At step 1606, the processing circuitry compares the command limit with the numbers of outstanding commands, and the throughput limit with required throughput. If the command limit is greater than the number of outstanding commands and the throughput limit is greater than the required throughput, then at step 1608, the processing circuitry reserves some portion (e.g., a certain amount of credits) of the required throughput and retrieves (i.e., fetches) the outstanding commands. At step 1610, the processing circuitry executes the retrieved commands using the reserved required throughput. However, if it is determined at step 1606 that the command limit is less than the number of outstanding commands, or the throughput limit is less than the required throughput, then method 1600 includes to optionally buffer the queue set at step 1612 before returning to step 1602.

In some embodiments, the method 1600 relies on the mapping of each of the QSs of step 1602 to a VE/domain tuple, as well as the assigning of command pools to the VEs and of throughput pools to the domains (as depicted in FIGS. 12-15). For example, based on this mapping, processing circuitry may perform the determinations at 1604 and the evaluations at step 1606 for each respective queue set of the plurality of queue sets stored at 1602.

In some embodiments, each time a command is dispatched, some throughput resources are consumed, and a command resource is consumed. The resources are consumed only from the command and throughput pools directly associated with the QS that is associated with the SQ that the command is retrieved from. Thus, no other pools are affected.

In some embodiments, a throughput pool may be decoupled with a QS it is coupled with in order to be shared by multiple Queue Sets. In some embodiments, a command pool may be decoupled with a QS it is coupled with in order to be shared by multiple Queue Sets.

In some embodiments, the command retrieving (i.e., fetching) priority is governed by a standard NVMe arbitration policy. In some embodiments, a higher priority tenant may be granted more throughput limit. In some embodiments, a higher priority domain may be granted more resources.

In some embodiments, command pool and throughput pool resources proportionally based on the expected amount of traffic on each domain. In some instances, the highest priority domains receive more traffic, and resources are shifted from lower priority domains to higher priority domains to maintain QoS; in other instances, the higher priority domains receive less traffic, and resources may be shifted to lower priority domains to maintain QoS.

In some embodiments, the processing circuitry is further to, in connection with step 1610, designate each queue set of the plurality of queue sets as available based on determining that the respective command limit is greater than the respective number outstanding commands for each respective queue set of the plurality of queue sets. For example, that designation may be made by processing circuitry based on step 508 and the related aspects of process 500. Moreover, the processing circuitry may be further to select a command execution queue from the at least one available command execution queue, access at least one command from the selected command execution queue, and execute the at least one accessed command (e.g., as in steps 514, 516, and 518 of process 500).

In some embodiments, the throughput limit (e.g., as is associated with a QS, based on a throughput pool) and the required throughput (e.g., as is associated with executing the commands of the QS) are each associated with a respective bandwidth limit and a required bandwidth for retrieving the at least one command, and a respective number of input/outputs per second (IOPS) limit and a required IOPS associated with the retrieving. Either of the respective bandwidth limit and the respective number of IOPS may be determined using a credit system (e.g., as shown in connection with FIGS. 8A, 8B, 9, 10, and 11). In some embodiments, a first set of values (e.g., first credits values) may be determined to indicate the bandwidth limit, and a second set of values (e.g., second credits values) may be determined to indicate the IOPS limit.

In some embodiments, the method also includes, for each retrieved outstanding command, generating a response (e.g., a command retrieval response, or a command fetch response, as mentioned above). The method also includes, based on the respective retrieved outstanding command, and based on the response, updating the command limit, the number of outstanding commands, the throughput limit, and the required throughput. For example, the aforementioned updating may include updating at least one first credits value and/or at least one second credits value.

The term “domain” may refer to a “priority domain” or to any other domain.

The terms “fetch” or “fetching” may be used interchangeably with the terms “retrieve” or “retrieving, respectively.”

The terms “virtual machine” or “virtual function” may be interchangeably with the term “virtual entity.”

The terms “an embodiment”, “embodiment”, “embodiments”, “the embodiment”, “the embodiments”, “one or more embodiments”, “some embodiments”, and “one embodiment” mean “one or more (but not all) embodiments” unless expressly specified otherwise.

The terms “including”, “comprising”, “having” and variations thereof mean “including but not limited to”, unless expressly specified otherwise.

The enumerated listing of items does not imply that any or all of the items are mutually exclusive, unless expressly specified otherwise.

The terms “a”, “an” and “the” mean “one or more”, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A device that is communicatively coupled to a host, the device comprising:

system memory for storing a plurality of queue sets, each queue set comprising at least one command from the host; and processing circuitry to determine, for each queue set:

a priority;

a command limit for the number of commands to retrieve;

a number of outstanding commands;

a throughput limit based on the priority and on a capability of the device;

a required throughput to be used in connection with the outstanding commands;

whether the command limit is greater than the number of outstanding commands; and whether the throughput limit is greater than the required throughput, wherein, based on determining that the command limit is greater than the number of outstanding commands and that the throughput limit is greater than the required throughput, the processing circuitry is further to retrieve the outstanding commands, reserve at least a portion of the required throughput, and execute the retrieved outstanding commands using at least the reserved required throughput.

2. The device of claim 1, wherein the host comprises at least one virtual entity to receive the at least one command from a client application.

3. The device of claim 1, wherein the processing circuitry is further to designate each queue set of the plurality of queue sets as available based on determining that the respective command limit is greater than the respective number of outstanding commands for each respective queue set of the plurality of queue sets.

4. The device of claim 3, further comprising at least one available command execution queue, wherein each available command execution queue corresponds to an available queue set of the plurality of queue sets and each available command execution queue is configured to store at least one of the retrieved outstanding commands, wherein the processing circuitry is further to, based on designating the queue set as available:

select a command execution queue from the at least one available command execution queue;

access at least one command from the selected command execution queue; and execute the at least one accessed command.

5. The device of claim 1, wherein the throughput limit and the required throughput are each associated with:

a respective bandwidth limit and a required bandwidth for retrieving the at least one command; and a respective number of input/outputs per second (IOPS) limit and a required IOPS associated with the retrieving.

6. The device of claim 5, wherein the processing circuitry is further to:

determine, for each queue set of the plurality of queue sets, a respective first set of values indicative of the respective bandwidth limit associated with the respective throughput limit and of the respective required bandwidth associated with the respective required throughput;

determine, for each queue set of the plurality of queue sets, a respective second set of values indicative of the respective IOPS limit associated with the respective throughput limit and of the respective required IOPS associated with the respective required throughput; and cause to be executed the respective retrieved commands for at least one of the plurality of queue sets based on the respective first set of values and on the respective second set of values.

7. The device of claim 1, wherein:

the command limit is based on a command pool;

the throughput limit is based on a throughput pool; and the command pool and the throughput pool are shared by at least two queue sets of the plurality of queue sets.

8. The device of claim 1, wherein:

in response to determining that the command limit is less than the number of outstanding commands, the processing circuitry is further to delay the retrieving of the outstanding commands until the command limit is increased; and based on determining that the throughput limit is less than the required throughput, the processing circuitry is further to delay the reserving of the required throughput until the throughput limit is increased.

9. The device of claim 1, wherein:

the processing circuitry is further to determine an amount of traffic on at least one virtual entity of the host; and the throughput limit is further based on the amount of traffic.

10. The device of claim 1, wherein the processing circuitry is further to, for each retrieved outstanding command:

generate a response based on the respective retrieved outstanding command; and based on the response, update the command limit, the number of outstanding commands, the throughput limit, and the required throughput.

11. The device of claim 1, wherein each queue set of the plurality of queue sets comprises a respective submission queue and a respective completion queue, wherein:

the submission queue is to store a command received from at least on virtual entity of the host; and the completion queue is to store at least one response generated based on at least one of the retrieved outstanding commands.

12. A method for managing retrieval of commands by a device that is communicatively coupled to a host, the method comprising:

determining, using processing circuitry of the device, for each queue set of a plurality of queue sets stored in a system memory of the device, wherein each queue set comprises at least one command from the host:

a priority;

a command limit for the number of commands to retrieve;

a number of outstanding commands;

a throughput limit based on the priority and on a capability of the device;

a required throughput to be used in connection with the outstanding commands;

whether the command limit is greater than the number of outstanding commands; and whether the throughput limit is greater than the required throughput; and based on determining that the command limit is greater than the number of outstanding commands and that the throughput limit is greater than the required throughput:

using the processing circuitry for retrieving the outstanding commands, reserving at least a portion of the required throughput, and executing the retrieved outstanding commands using at least the reserved required throughput.

13. The method of claim 12, wherein the host comprises at least one virtual entity to receive the at least one command from a client application.

14. The method of claim 12, wherein the processing circuitry is further to designate each queue set of the plurality of queue sets as available based on determining that the respective command limit is greater than the respective number outstanding commands for each respective queue set of the plurality of queue sets.

15. The method of claim 14, wherein the device further comprises at least one available command execution queue, wherein each available command execution queue corresponds to an available queue set of a plurality of queue sets and each available command execution queue is configured to store at least one of the retrieved outstanding commands, wherein the method further comprises, based on designating the queue set as an available queue set:

selecting a command execution queue from the at least one available command execution queue;

accessing at least one command from the selected command execution queue; and executing the at least one accessed command.

16. The method of claim 12, wherein the throughput limit and the required throughput are each associated with:

a respective bandwidth limit and a required bandwidth for retrieving the at least one command, and a respective number of input/outputs per second (IOPS) limit and a required IOPS associated with the retrieving; and the method further comprises:

determining, for each queue set of the plurality of queue sets, a respective first set of values indicative of the respective bandwidth limit associated with the respective throughput limit and of the respective required bandwidth associated with the respective required throughput;

determining, for each queue set of the plurality of queue sets, a respective second set of values indicative of the respective IOPS limit associated with the respective throughput limit and of the respective required IOPS associated with the respective required throughput; and executing the respective retrieved commands for at least one of the plurality of queue sets based on the respective first set of values and on the respective second set of values.

17. The method of claim 12, wherein:

the command limit is based on a command pool;

the throughput limit is based on a throughput pool; and the command pool and the throughput pool are shared by at least two queue sets of the plurality of queue sets.

18. The method of claim 12, further comprising:

in response to determining that the command limit is less than the number of outstanding commands, delaying the retrieving of the outstanding commands until the command limit is increased; and based on determining that the throughput limit is less than the required throughput, delaying the reserving of the required throughput until the throughput limit is increased.

19. The method of claim 12, wherein the method further comprises:

determining an amount of traffic on at least one virtual entity of the host; and basing the throughput limit on the amount of traffic.

20. The method of claim 12, wherein the method further comprises, for each retrieved outstanding command:

generating a response based on the respective retrieved outstanding command; and based on the response, updating the command limit, the number of outstanding commands, the throughput limit, and the required throughput.

* * * * *